(12) United States Patent
Boffi et al.

(10) Patent No.: US 8,437,645 B2
(45) Date of Patent: May 7, 2013

(54) SYSTEM AND METHOD FOR COHERENT DETECTION OF OPTICAL SIGNALS

(75) Inventors: Pierpaolo Boffi, Voghera (IT); Lucia Marazzi, Borgarello (IT); Paolo Martelli, Milan (IT); Paola Parolari, Monza (IT); Aldo Righetti, Milan (IT)

(73) Assignee: Google Inc., Mountain View, CA (US)

( * ) Notice: Subject to any disclaimer, the term of this patent is extended or adjusted under 35 U.S.C. 154(b) by 359 days.

(21) Appl. No.: 12/739,842

(22) PCT Filed: Dec. 6, 2007

(86) PCT No.: PCT/IB2007/054948
§ 371 (c)(1),
(2), (4) Date: Jul. 1, 2010

(87) PCT Pub. No.: WO2009/071964
PCT Pub. Date: Jun. 11, 2009

(65) Prior Publication Data
US 2010/0266291 A1    Oct. 21, 2010

(51) Int. Cl.
*H04B 10/00* (2006.01)
*H04B 10/06* (2006.01)

(52) U.S. Cl.
USPC ............... 398/208; 398/204; 398/152

(58) Field of Classification Search .......... 398/203, 398/204, 208, 65, 152
See application file for complete search history.

(56) References Cited

U.S. PATENT DOCUMENTS

| 4,718,120 A * | 1/1988 | Tzeng ................. 398/204 |
| 5,008,958 A | 4/1991 | Cimini, Jr. et al. |
| 5,060,312 A * | 10/1991 | Delavaux .............. 398/204 |
| 7,209,660 B1 | 4/2007 | Yee et al. |
| 7,321,621 B2 * | 1/2008 | Popescu et al. ......... 375/233 |
| 7,684,712 B1 * | 3/2010 | Roberts et al. ......... 398/208 |
| 7,801,395 B2 * | 9/2010 | Shpantzer et al. ...... 385/14 |
| 2003/0053070 A1 * | 3/2003 | Fan et al. ............. 356/477 |

FOREIGN PATENT DOCUMENTS

| EP | 0 445 943 A2 | 9/1991 |
| EP | 0 479 256 A2 | 4/1992 |

OTHER PUBLICATIONS

International Search Report mailed Aug. 20, 2008, for PCT/IB2007/054948, (3 pages).
F. Xia et al., "A Monolithically Integrated Optical Heterodyne Receiver," IEEE Photonics Technology Letters, 17(8):1716-1718 (2005).

* cited by examiner

*Primary Examiner* — Dalzid Singh
(74) *Attorney, Agent, or Firm* — Honigman Miller Schwartz and Cohn LLP

(57) ABSTRACT

An optical communication system (100; 2300) comprises at least a transmitter (110) apt to emit a differential phase shift keying (DPSK) optical signal having a bit-rate equal to R, at least a receiving system (1200) for receiving the differential phase shift keying optical signal; and an optical link (130) optically connecting the transmitter and the receiving system for transmitting the DPSK optical signal from the transmitter to the receiving system, wherein the receiving system comprises a coherent optical receiving device (1205) apt to coherently receive the propagated DPSK optical signal and to emit at least one electrical signal (I) related to the received DPSK optical signal, and wherein the receiving system further comprises at least one electrical filter (270) for filtering the at least one electrical signal and having −3 dB double-side bandwidth greater than or equal to 0.44 R and lower than or equal to 0.68 R, and at least one squarer (280) for squaring the at least one filtered electrical signal. A related method for optical communication is also disclosed.

39 Claims, 24 Drawing Sheets

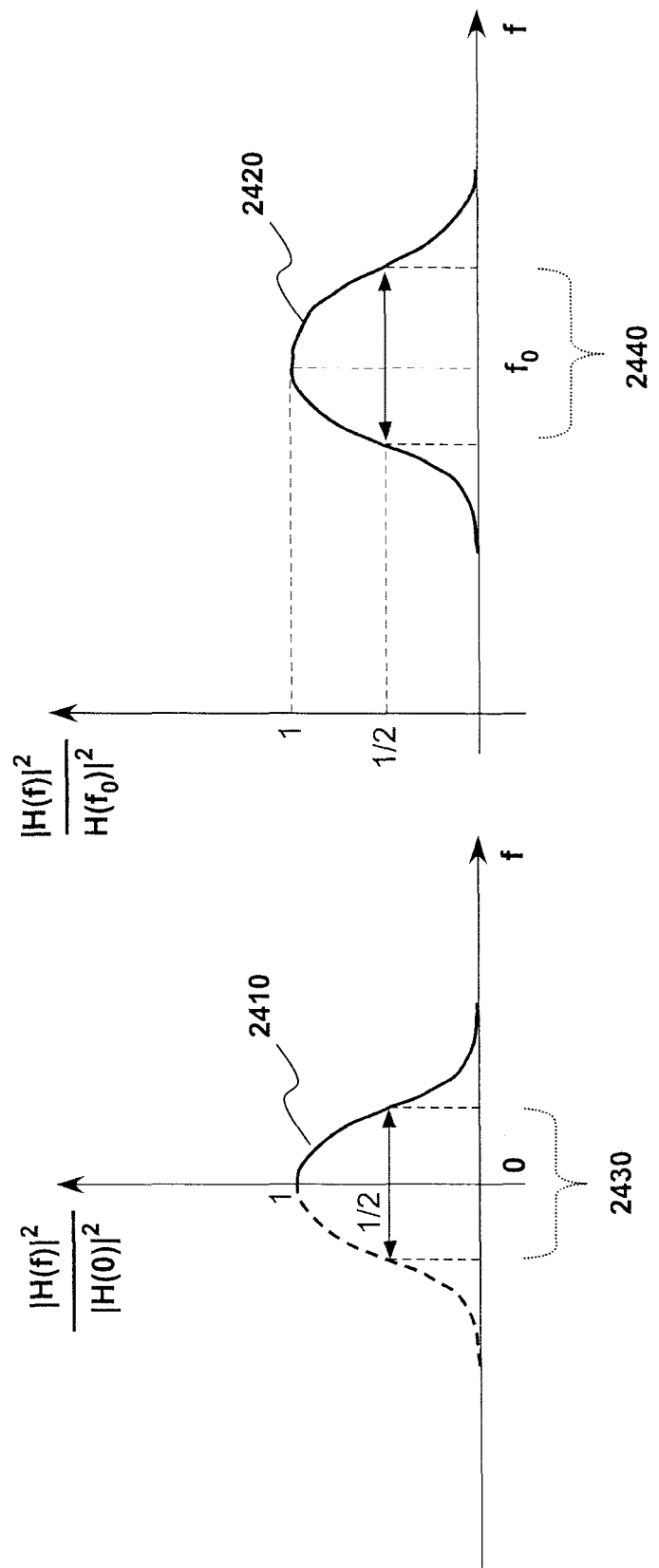

SYSTEM AND METHOD FOR COHERENT DETECTION OF OPTICAL SIGNALS

RELATED APPLICATION

This application is the U.S. National Stage of International Application No. PCT/IB2007/054948, filed Dec. 6, 2007, which designates the U.S., published in English. The entire teachings of the above application are incorporated herein by reference.

FIELD OF THE INVENTION

The present invention relates to the field of DPSK optical communication systems based on optical coherent receiving techniques.

BACKGROUND OF THE INVENTION

Coherent optical detection in optical communication systems provides a receiver sensitivity greatly enhanced with respect to direct detection (DD) schemes.

In coherent receivers the optical signal interferes with a local oscillator (which is locked to the signal both in polarization and in phase or frequency) and the beating term, which contains the information of the optical signal, is then directly detected by a photodiode. The local oscillator has an optical power greatly higher than the power of the optical signal and it acts as an amplifier of the beating term so that the thermal noise of the photodetection electronic circuit becomes negligible and the shot-noise quantum limit may be approached. Examples of coherent optical detection schemes are described in article A. W. Davis et al., J. L. T. Vol. LT-5, No.4, April 1987, pp.561-572 (hereinafter referred to as 'Davis et al'), which is herein incorporated by reference.

Above cited article Davis et al discloses a (binary) differential phase shift keying (DPSK) modulation format received coherently. In binary DPSK, hereinafter called simply DPSK, the electrical binary data signal is differentially encoded ('pre-coding') before modulating the optical signal, so that one of the two symbols of the data signal, e.g. a "one", in the optical DPSK signal corresponds to a change of the optical phase by 180° between two successive bits, while the other symbol corresponds to a succession of two bits in phase.

One advantage of the coherent reception is the capacity to obtain an electrical signal containing information on both amplitude and phase of the optical field. In this respect, from a mathematical point of view the coherent optical detection acts on the field of the optical signal as a linear operator, at this regard similarly to the nature of the chromatic dispersion accumulated by the optical signal during propagation along the optical link. Thus, in principle it is possible to wholly compensate for any accumulated dispersion (e.g. both chromatic and polarization mode dispersion) by suitably equalizing the coherently received electrical signal.

An example of electric dispersion compensation is described in the article by J. H. Winters, J. L. T., vol. 8, pp.1487-1491 (1990).

SUMMARY OF THE INVENTION

The Applicant has noted that the optical coherent receivers disclosed in Davis et al for receiving a DPSK optical signal, such as for example the phase diversity receiver of FIGS. 7 and 11 of the article, do not provide the desired robustness to the dispersion accumulated by the DPSK optical signal during propagation from the transmission to the reception.

The Applicant has found a method and a system for optical transmission which can solve one or more of the problems stated above.

In an aspect of the present invention, an optical communication system is provided, the optical communication system comprising a transmitter apt to emit a differential phase shift keying (DPSK) optical signal having a bit-rate R; a receiving system; and an optical link optically connecting the transmitter and the receiving system for propagating the DPSK optical signal from the transmitter to the receiving system, wherein the receiving system comprises a coherent optical receiving device apt to coherently receive the propagated DPSK optical signal and to emit at least an electrical signal related to the propagated DPSK optical signal.

In an aspect the receiving system comprises at least one electrical filter for filtering the above electrical signal, the filter having −3 dB double-side bandwidth greater than or equal to 0.44 R and lower than or equal to 0.68 R. In the present description and claims, the expression "−3 dB double-side bandwidth" means the width of the spectral band around the peak frequency wherein the squared modulus of the filter transfer function is everywhere greater than or equal to half the squared modulus of the filter transfer function at the peak frequency. The peak frequency is defined as the non negative frequency in correspondence of which the squared modulus of the filter transfer function assumes the maximum value. In case of multiple non negative frequencies wherein the squared modulus of the filter transfer function assumes the maximum value, any of them can be suitably selected as the above peak frequency. Preferably, the −3 dB double-side bandwidth is greater than or equal to 0.50 R and lower than or equal to 0.62 R. Still more preferably, the −3 dB double-side bandwidth is greater than or equal to 0.54 R and lower than or equal to 0.58 R. Advantageously, the electrical filter is a $5^{th}$ order Bessel filter.

In an aspect the electrical filter is a low-pass filter, wherein the above defined peak frequency is at (typically) or near zero frequency. In this aspect the above −3 dB double-side bandwidth is determined taking into account also the negative frequencies. In this respect, the low-pass filter is defined as the filter wherein the peak frequency differs from zero less than half the −3 dB double-side bandwidth.

In an alternative aspect, the electrical filter is a pass-band filter, wherein the peak frequency differs from zero more than half the −3 dB double-side bandwidth. In this aspect the filter is typically symmetrical around a central frequency. Also, the above defined −3 dB double-side bandwidth is also known as full width half maximum.

FIG. 24A and 24B show the transfer function of respectively an exemplary low-pass (curve 2410) and an exemplary pass-band (curve 2420) electrical filter. The width of the band 2430 represents the −3 dB double-side bandwidth of the low-pass filter and the width of the band 2440 represents the −3 dB double-side bandwidth of the pass-band filter.

In an aspect, the electrical filter may be a digital filter, possibly in combination with an analog-to-digital converter (ADC).

In an aspect the receiving system comprises at least one squarer (or square-law device) for squaring the above filtered electrical signal. The squared electrical signal is a two-level signal containing the information carried by the propagated DPSK optical signal.

The applicant has found that the combination of the above coherent optical receiving device, the above electrical filter and the above squarer allows to efficiently receive and decode a DPSK optical signal while at the same time improving the dispersion robustness of the received DPSK optical signal.

According to the present invention, the receiving system comprises a coherent optical receiving device, wherein the propagated DPSK optical signal is mixed with the optical field of a local oscillator and one or more mixed optical signals therefrom obtained are photodetected so as to obtain an electrical signal related to the propagated DPSK signal.

Advantageously, the coherent optical receiving device may be a homodyne coherent optical receiving device (e.g. with a phase locking by an optical phase locked loop (OPLL)), or a heterodyne coherent optical receiving device (e.g. with synchronous demodulation based on an electrical PLL), or a phase diversity coherent optical receiving device. In these configurations the Applicant has predicted a 10 Gbit/s DPSK 'reach' of about 200 km on a conventional single mode fiber having chromatic dispersion of about 17 ps/km/nm.

In an aspect the coherent optical receiving device within the receiving system comprises a local oscillator apt to emit an optical field, having a phase, and an optical hybrid apt to mix the optical field and the propagated DPSK optical signal. The local oscillator is preferably a laser source. In an aspect, the local oscillator is a laser source having an emission frequency controllable by controlling the pumping electrical current. The optical hybrid typically has a first input port optically connected to the optical link so as to receive the propagated DPSK optical signal and a second input port optically connected to the local oscillator so as to receive the optical field. Typically the optical hybrid has at least a pair of output ports for respectively outputting either in-phase (0°-180°) or quadrature (90°-270°) components of the DPSK optical signal with respect to the phase of the optical field of the local oscillator. Conventionally, in the present description and claims, the expression "in-phase components" refers both to the component of the DPSK optical signal having 0° phase difference with respect to the phase reference given by the local oscillator and to the component of the DPSK optical signal having 180° phase difference with respect to the phase reference. Similarly, the expression "quadrature components" refers both to the component of the DPSK optical signal having 90° phase difference with respect to the local oscillator phase reference and to the component of the DPSK optical signal having 270° phase difference.

In an aspect the coherent optical receiving device comprises at least one photodetector connected to at least one port of the above pair of output ports for detecting at least one either in-phase (0°-180°) or quadrature (90°-270°) component and for generating a first electrical signal directly proportional to said at least one either in-phase (0°-180°) or quadrature (90°-270°) component.

In an aspect the at least one photodetector is a differential photodetector connected to both ports of the at least a pair of output ports for detecting both of either in-phase (0°-180°) or quadrature (90°-270°) components.

In an alternative aspect, the at least one photodetector is a single-input photodetector with alternating current (AC) output.

In an aspect, the optical hybrid is an eight-port optical hybrid, or 90° optical hybrid, having a further pair of output ports. In this aspect, the above at least a pair of output ports and the further pair of output ports are configured for outputting respectively in-phase (0°-180°) and quadrature (90°-270°) components of the DPSK optical signal with respect to the phase of the optical field of the local oscillator. A further photodetector is connected to at least one output port of the further pair of output ports for detecting at least one quadrature (90°-270°) component and for generating a second electrical signal directly proportional to said at least one quadrature (90°-270°) component.

In an aspect the further photodetector is a differential photodetector connected to both ports of the further pair of output ports for detecting both of quadrature (90°-270°) components.

In an alternative aspect, the further photodetector is a single-input photodetector with AC output.

In an aspect, the receiving system comprises a discriminating system electrically connected to the squarer so as to receive the (analogic) squared electrical signal. Typically the discriminating system is a clock and data recovery (CDR) circuit. The discriminating system typically comprises a clock recovery circuit, a digital sampler and a threshold discriminator. The discriminating system is configured for sampling the received (analogic) squared electrical signal on the basis of a clock recovered by the clock recovery circuit from the received squared electrical signal, and for discriminating a sequence of digital binary values, containing low and high levels, corresponding to the original binary data signal.

In an aspect, the transmitter is a DPSK transmitter comprising a laser source and an optical modulator for phase modulating the output of the laser source so as to generate the DPSK optical signal phase-modulated among two phase levels, preferably differing by 180°, at a bit-rate R.

The optical modulator is a single-waveguide phase modulator or a Mach-Zehnder interferometer (MZI) modulator in push-pull configuration (or equivalently a MZI-modulator in dual-drive configuration having opposite drive voltages).

In an aspect, the transmitter is a non-return-to-zero (NRZ) DPSK transmitter. In an alternative aspect, the transmitter is a return-to-zero (RZ) DPSK transmitter, preferably comprising, in addition to the above, also a RZ carver, typically consisting in a push-pull MZI modulator driven by a sinusoidal signal, as known in the art.

In an aspect, the transmitter comprises a differential precoder electrically connected to the optical modulator for driving said optical modulator. The differential precoder is apt to receive the original electrical binary data signal at a rate R, containing the information to be transmitted, and to emit a differentially precoded binary signal, related to said binary data signal, for driving said optical modulator.

In an embodiment the differential precoder is configured for running the logical operation NOT(XOR)—wherein NOT is the logical NOT (negation) operation and XOR is the exclusive OR logical operation—between the current bit of the binary data signal and the one-bit-delayed bit of the differentially precoded binary signal itself. In this case the high level of the above sequence of digital binary values output from the discriminator corresponds to a bit "1" in the original binary data signal.

In an alternative embodiment the differential precoder is configured for running the logical operation (XOR) among the current bit of the binary data signal and the one-bit-delayed bit of the differentially precoded binary signal. In this case the high level of the above sequence of digital binary values output from the discriminator corresponds to a bit "0" in the original binary data signal.

In an aspect, the receiving system comprises an electrical dispersion compensator (EDC) placed upstream the squarer with respect to the direction of propagation of the above electrical signal, for compensating a dispersion in said at least one electrical signal. Typically, the dispersion corresponds to the dispersion acquired by the DPSK optical signal during propagation along the optical link. Advantageously, the EDC is an integrally spaced EDC.

In an aspect, the above EDC is a linear analogue electrical circuit containing at least a tapped delay-line equalizer (or equivalently a N-tap transversal filter). Preferably the tapped delay-line equalizer has delay-lines having delays equal to an integer multiple of a given amount comprised between 0.7/R e 1.4/R, preferably greater than 0.9/R. In an embodiment, the above given amount is greater than or equal to 1/R and less than or equal to 1.2/R. In one embodiment, the tapped delay-line equalizer is synchronous, i.e. the delay-lines have delays equal to integer multiples of 1/R.

In another aspect, the above EDC is a digital EDC, i.e. realized by a digital processor. The digital EDC may advantageously be based on blocks digitally implementing N-tap transversal filters, running linear combinations of N samples sequences acquired by an analog-to-digital converter.

In an aspect the digital EDC is synchronous, i.e. the EDC runs a digital processing of sequences of samples acquired with a sampling rate equal to R, for example by way of an analog-to-digital converter which receives a clock recovered from the above electrical signal by a clock recovery circuit. In this aspect, the above squarer is comprised within the above digital processor which is configured for performing a squaring operation. Furthermore, in this aspect the above digital processor, which receives the clock above, advantageously performs the operations of electric compensation of the dispersion, squaring and binary threshold discrimination.

In an aspect, the EDC is a base-band EDC having a pair of input ports for receiving the above first and second electrical signals respectively and a pair of output ports for outputting the compensated first and second electrical signals respectively. The base-band EDC comprises four N-tap transversal filters having adjustable gains and two adders.

In an aspect, the EDC is a pass-band EDC comprising an intermediate frequency (IF) pass-band analog electrical circuit for receiving in input the first electrical signal, the EDC consisting in a N-tap transversal filter having gains and phase-shifts both adjustable. In an alternative aspect, the pass-band EDC comprises a quadrature electrical hybrid and a pair of tapped-delay line equalizers or N-tap transversal filters having only the gains adjustable.

In an alternative aspect, the pass-band EDC comprises a dispersive microwave waveguide or microstrip line.

In an aspect, the EDC is a pass-band EDC comprising a pair of IF pass-band analog electrical circuits for receiving in input respectively the first and second electrical signal, each circuit consisting in any of the above aspect of the pass-band EDC.

In an aspect, the receiving system is a homodyne receiving system, comprising an optical phase locked loop (OPLL) for phase locking the optical field of the local oscillator to the propagated DPSK optical signal. In this aspect, the above electrical signal consists of the above first electrical signal.

In an aspect the OPLL is a Costas OPLL. In this aspect it may comprise a multiplier connected to the output of each of the at least one and the further photodetector for multiplying the above first and second electrical signal in order to obtain a control signal for controlling the local oscillator emission frequency.

In an alternative aspect, the OPLL is a decision driven OPLL.

In an aspect, the difference in absolute value between the central frequency of the received DPSK optical signal and the central frequency of the optical field of the local oscillator is kept at a predetermined value.

In an aspect, the predetermined value, called intermediate frequency (IF), is between R and 3 R. In an alternative aspect, the predetermined value is below 0.02 R.

In an aspect, the receiving system comprises an optical frequency locking loop (OFLL) configured for keeping the above difference constant at the predetermined value. In case the predetermined value is the IF, the OFLL is configured for keeping the deviation of said difference from the IF less than 0.2 R in absolute value. In another aspect, the OFLL keeps the above difference less than 0.02 R in absolute value.

In an aspect, the optical hybrid is a four-ports hybrid, or 180° hybrid, for example a 3 dB directional coupler.

In an aspect, the receiving system comprises a synchronous heterodyne demodulator, comprising a wideband pass-band filter centered at the IF, an electrical phase locked loop (EPLL) and the above at least one (low-pass) electrical filter having −3 dB double-side bandwidth between 0.44 R and 0.68 R.

In an aspect, the EPLL is a squaring loop. In an alternative aspect the EPLL is a Costas EPLL.

In an aspect, the receiving system is a phase diversity single stage receiving system, wherein the receiving system comprises the above electrical filter for filtering the above first electrical signal and a further electrical filter for filtering the above second electrical signal, both the filters having −3 dB double-side bandwidth greater than or equal to 0.44 R and lower than or equal to 0.68 R, the above squarer and a further squarer for squaring respectively the first and second filtered electrical signal, and an adder for adding the first and second squared electrical signals.

In an aspect, the receiving system is a phase diversity double stage receiving system, wherein the coherent optical receiver further comprises an electrical oscillator for emitting an electrical oscillation at the above intermediate frequency, a pair of multipliers for multiplying the above first electrical signal and the above second electrical signal respectively by said electrical oscillation and a replica of said electrical oscillation phase-shifted by 90°, and an adder for adding the first and second multiplied electrical signal, so as to obtain said at least one electrical signal.

Typically, the receiving system comprises a polarization matching system for matching the polarization of the propagated DPSK optical signal with the polarization of the optical field of the local oscillator.

In an aspect the polarization matching system comprises a polarization stabilizer upstream to the optical hybrid with respect to the direction of propagation of the propagated DPSK optical signal. The polarization stabilizer is apt to receive in input the propagated DPSK optical signal having a stochastically time-varying polarization and to emit in output a stabilized DPSK optical signal having fixed polarization matched to the one of the optical field of the local oscillator at the input ports of the optical hybrid.

In an alternative aspect the polarization matching system comprises a polarization transformer upstream to the optical hybrid with respect to the direction of propagation of the optical field of the local oscillator. The polarization transformer is apt to receive in input the optical field having typically a fixed polarization and to emit in output a transformed optical field having polarization matched to the one of the propagated DPSK optical signal at the input ports of the optical hybrid. In this case a feedback system is configured for controlling the polarization transformer on the basis of at least one among the first and second electrical signal above.

In still an alternative aspect, the polarization matching system comprises a polarization diversity scheme.

According to a further aspect of the present invention, a polarization-division-multiplexing (PolDM) optical communication system comprises the optical communication system according to the above and further comprises a further transmitter, a polarization multiplexer optically connected to the above transmitter and the further transmitter and having an output port optically connected to the optical link, a polarization demultiplexer at the end of the optical link and having a first output port optically connected to the above receiving system and a second output port optically connected to a further receiving system. The further transmitter is in accordance to the above transmitter. Typically the respective laser source of the two transmitters have the same wavelength. The polarization multiplexer is apt to receive in input the above DPSK optical signal from the above transmitter and a further DPSK optical signal from the further transmitter and to output at the output port the two DPSK optical signals orthogonally polarization multiplexed together. In other words, an orthogonal relationship exists among the polarizations of the two DPSK optical signals when multiplexed at the output port. The polarization demultiplexer is apt to receive in input the two propagated DPSK optical signals polarization multiplexed and to output separately at the two output ports respectively the above propagated DPSK optical signal and the further propagated DPSK optical signal. The further receiving system is in accordance to the above receiving system.

In an aspect both the two transmitters are RZ-DPSK transmitters as described above and the two RZ-DPSK optical signals are time-interleaved polarization multiplexed.

In an aspect a polarization stabilizer as described above is optically connected to the polarization demultiplexer in an upstream position with respect to the direction of propagation of the two polarization multiplexed DPSK optical signals so as to stabilize the polarization state of both the propagated DPSK optical signals before entering the polarization demultiplexer.

Advantageously this configuration avoids the need of a respective polarization matching system within each of the two receiving systems.

In an aspect a single local oscillator is followed by a polarization splitter apt to split the optical field of the single local oscillator into two polarized components of the optical field. The two fractional optical fields are then used as the above optical field of the local oscillator for respectively the two receiving systems. In this way it advantageously employed a single local oscillator instead of two separate local oscillators.

According to a still further aspect of the present invention, a bidirectional optical communication system comprises a first and a second optical communication system in any of the above aspects, wherein the receiving system of the first communication system is located at a first site wherein the transmitter of the second communication system is located and the receiving system of the second communication system is located at a second site wherein the transmitter of the first communication system is located. In this way it is advantageously possible to use a single laser source at each of the first and second site, the single laser source acting both as the respective laser source and the respective local oscillator.

In another aspect of the present invention, a receiving system according to any of the above aspects is provided.
According to a further aspect of the present invention, a method for optical communication comprises generating a DPSK optical signal having a bit-rate R and comprising data information, propagating the DPSK optical signal at a distance thereof, coherently receiving the propagated DPSK optical signal in order to obtain at least one electrical signal related to the propagated DPSK optical signal, filtering the at least one electrical signal by way of an electrical filter having −3 dB double-side bandwidth greater than or equal to 0.44 R and lower than or equal to 0.68 R, and squaring the at least one filtered electrical signal.

BRIEF DESCRIPTION OF THE DRAWINGS

The features and advantages of the present invention will be made clear by the following detailed description of an embodiment thereof, provided merely by way of non-limitative example, description that will be conducted making reference to the annexed drawings, wherein:

FIGS. 24A and 24B exemplarily show the transfer function of respectively a low-pass and a pass-band electrical filter.

DETAILED DESCRIPTION OF THE PREFERRED EMBODIMENT(S) OF THE INVENTION

Figure 1:
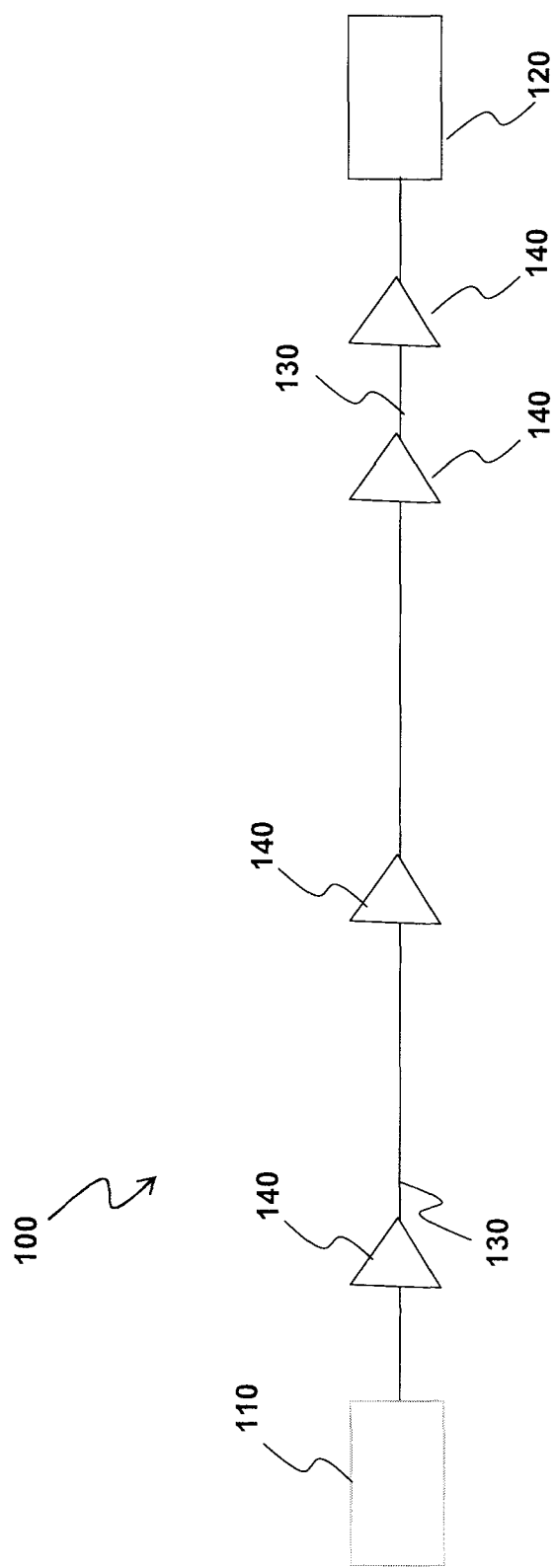
FIG. 1 schematically shows in terms of functional blocks an exemplary optical communication system according to the present invention.

FIG. 1 shows an optical communication system architecture according to a possible embodiment of the present invention.

The optical communication system 100 comprises at least a transmitter 110, an end apparatus 120 and an optical line 130 which optically connects the transmitter and the end apparatus.

The transmitter 110 is an opto-electronic device apt to emit an optical signal carrying modulation-encoded information. It typically comprises an optical source (e.g., a laser) apt to emit an optical radiation at a given wavelength and a modulator apt to encode information onto the optical radiation.

The optical line 130 may be formed by a plurality of sections of optical transmission media, such as for example optical fiber sections, preferably cabled. Between two adjacent sections of optical fiber, an optical device is typically placed, such as for example a fiber splice or a connector, a jumper, a planar lightguide circuit, a variable optical attenuator or the like. For improving functionality and performance of the system 100, one or a plurality of optical, electronic or opto-electronic devices may be placed along the line 130. FIG. 1 exemplarily shows a plurality of optical amplifiers 140, which may be line-amplifiers, optical boosters or pre-amplifiers.

The end apparatus 120 is a corresponding opto-electronic device apt at least to receive the optical signal emitted by the transmitter and propagated through the optical link, to decode it and to output a binary data sequence containing the carried information.

In case a wavelength division multiplexing (WDM) technique is used, a plurality of optical transmitters 110 are multiplexed together, each transmitter emitting an optical signal in accordance to the present invention. Each optical signal (called WDM optical channel) has a respective optical frequency equally spaced from the others by a given frequency spacing (e.g. 50 or 100 GHz). Preferably, said optical frequency lies in the near-infrared wavelength range, e.g. from 900 nm to 1700 nm, more preferably it lies in the range from about 1530 to about 1565 nm, also known as 'C-band'. The multiplexed optical signals, after propagation along the optical line 130, are optically demultiplexed into the single optical signals, which are then singly received in accordance to the present invention. In case of a WDM optical communication system, one or more optical processing nodes (OPN, not shown) may be optically coupled to the optical line 130, each apt to filter or route or add or drop or regenerate, fully or partially, at least one WDM optical channel propagating through the optical line 130. The OPN is preferably dynamically tunable or reconfigurable. In the particular case wherein the optical processing node is a node adapted to route or add and/or drop the optical signal, the routed or added or dropped channel(s) may be received or transmitted by further end apparatus(es) or, respectively, transmitter(s). The further end apparatus(es) and transmitter(s), which may be co-located with the OPN node or at a distance thereof, are in accordance to the present invention.

According to the present invention, the transmitter 110 in operation emits a differential phase shift keying (DPSK) optical signal. The DPSK optical signal is based on a binary 0-180° phase modulation.

The transmitter comprises a laser source and an optical modulator for phase modulating the output of the laser source so as to generate the DPSK optical signal phase modulated at a bit-rate R among two (0-180°) phase levels. The optical modulator can be a phase modulator or a Mach-Zehnder interferometer (MZI) modulator in push-pull configuration (or equivalently a MZI-modulator in dual-drive configuration having opposite drive voltages), driven so as to toggle between two consecutive maxima of the square of its transfer function. This arrangement provides a non-return-to-zero (NRZ) DPSK optical signal. The present invention also optionally contemplates an additional optical modulator for additionally modulating the optical intensity of the above NRZ-DPSK optical signal, so as to obtain a return-to-zero (RZ) DPSK optical signal. The additional modulator may be for example a carver consisting in a MZI driven by an electrical sinusoid, as known in the art.

In case of RZ-DPSK format, an advantage of the present invention is that the electrical filtering after detection of the propagated DPSK signal (hence after RZ modulation) allows to achieve high robustness to the dispersion, since the bandwidth is kept narrow at reception even in presence of RZ format. In addition, the RZ modulation format is more robust to polarization mode dispersion than the NRZ modulation format.

The transmitter 110 comprises a differential precoder (not shown) electrically connected to the optical modulator for driving the latter. In operation, the differential precoder receives in input an electrical binary data signal, containing the information to be transmitted, and emit in output a differentially precoded binary signal, related to said binary data signal, for driving the optical modulator, as known in the art. For example, the differential precoder runs the NOT(XOR) or alternatively the XOR logical operation among the current bit of the binary data signal and the preceding bit of the differentially precoded binary signal.

Figure 2:
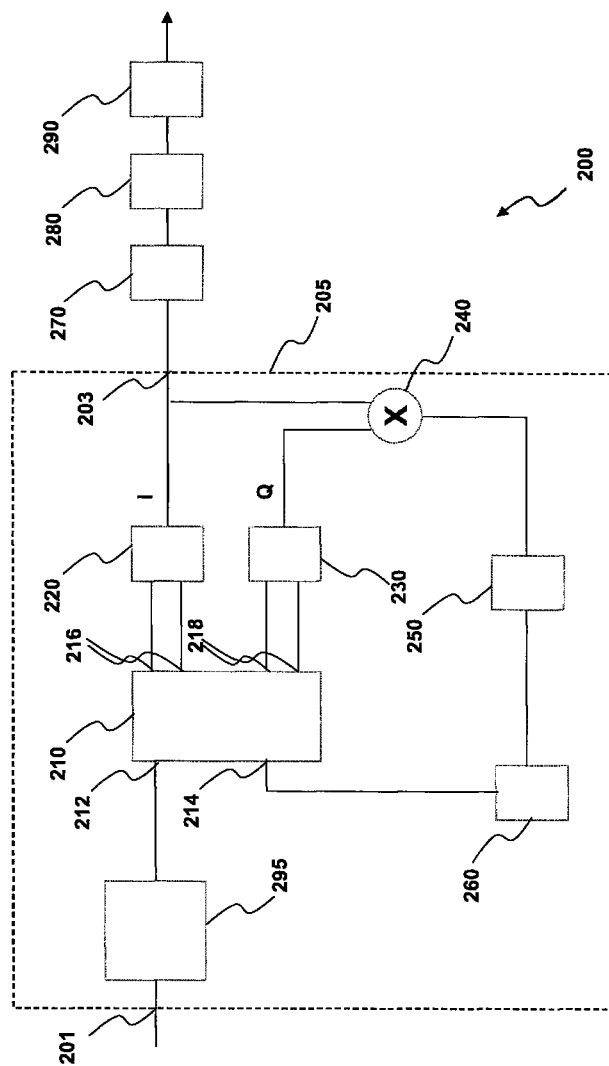
FIG. 2 is a schematic diagram showing in terms of functional blocks a first embodiment of the receiving system according to the present invention.

FIG. 2 shows a schematic diagram of an optical receiving system 200 in accordance with a first embodiment of the present invention. The optical receiving system 200 is comprised within the end apparatus 120 of FIG. 1.

The optical receiving system 200 comprises a coherent optical receiving device 205 based on a homodyne coherent receiving architecture with Costas optical phase locked loop (OPLL). The device 205 has an optical input port 201 optically connectable to the optical link 130 and an electric output port 203.

The coherent optical receiving device 205 comprises an optical hybrid 210 having a first input port 212 optically connected to the input port 201 and a second input port 214 optically connected to a local oscillator 260. The optical hybrid 210 further has a first pair of output ports 216 optically connected to a first differential photodetector 220 for outputting in-phase components (0° and 180°) of the optical signal with respect to the local oscillator and a second pair of output ports 218 optically connected to a second differential photodetector 230 for outputting quadrature components (90° and 270°) of the optical signal with respect to the local oscillator. The optical hybrid 210 of FIG. 2 is exemplarily an eight-port 90° optical hybrid as shown in FIG. 10(c) of the Davis et al. article.

In an alternative configuration (not shown), the first and second photodetector 220 and 230 are single-input photodetector each one coupled to one output port of, respectively, the first and second pair of output ports 216 and 218.

The coherent optical receiving device 205 further comprises a multiplier 240 electrically connected, by way of electrical connecting lines, to the output of the first and second differential photodetector and an electrical loop filter 250 electrically interposed between the output of the multiplier 240 and an input of the local oscillator 260.

Alternatively to the Costas OPLL shown and described herein, it is possible to use alternative OPLL schemes suitable to PSK modulation, such as a balanced pilot-carrier PLL or a decision-driven loop, known in the art.

According to a preferred embodiment of the present invention, an electrical filter 270 is electrically connected to the output port 203 which in turn is electrically connected to the output port of the first differential photodetector 220. In this embodiment the electrical filter 270 is a low-pass filter. Preferably, the filter 270 has −3 dB double-side bandwidth greater than or equal to 0.44 R and lower than or equal to 0.68 R. More preferably, the −3 dB double-side bandwidth is greater than or equal to 0.50 R and lower than or equal to 0.62 R. Still more preferably, the −3 dB double-side bandwidth is greater than or equal to 0.54 R and lower than or equal to 0.58 R. Advantageously, the electrical filter is a $5^{th}$-order Bessel filter having −3 dB double-side bandwidth equal to about 0.56 R, being R the bit-rate of the DPSK optical signal.

A squarer or 'square-law' device 280 and a discriminating system 290 are electrically cascaded in the cited order downstream to the optical filter 270 with respect to the direction of propagation of the electrical signals. The discriminating system 290 comprises a clock and data recovery (CDR) circuit, a sampling circuit and a threshold discriminator.

A polarization stabilizer 295 is optically interposed between the input port 201 of the coherent receiving device 205 and the first input port 212 of the optical hybrid 210. The polarization stabilizer 295 may be for example of the type described in patent application WO03/014811.

In operation, the DPSK optical signal is received at the input port 201 of the coherent optical receiving device 205 after having propagated along the optical link 130 and is mixed with the optical field coming from the local oscillator 260 by way of the optical hybrid 210. Before mixing, the propagated DPSK optical signal is fed to the polarization stabilizer 295 which stabilizes its time-varying input polarization state into an output fixed polarization state, so that at the input ports 212, 214 of the hybrid 210 the polarization state of the DPSK optical signal and the optical field of the local oscillator are in a fixed relationship (e.g. coincident). In this way the amplitude of the mixed optical signals at the output ports of the optical hybrid is made independent from the polarization state of the DPSK optical signal received at the input port 201.

The in-phase outputs (0° and 180°) at the first pair of output ports 216 are received by the first differential photodetector 220, which outputs a first electrical signal I directly proportional to an in-phase component of the optical field of the DPSK optical signal with respect to the optical field of the local oscillator.

The quadrature outputs (90° and 270°) at the second pair of output ports 218 are received by the second differential photodetector 230, which outputs a second electrical signal Q directly proportional to a quadrature component of the optical field of the DPSK optical signal with respect to the optical field of the local oscillator.

In order to lock the phase (and hence the frequency) of the local oscillator with that of the received DPSK optical signal a Costas OPLL is exemplary used. Here, the first and second electrical signal I and Q are multiplied in the block 240 and then filtered in the filter 250 of the feedback loop so as to generate a signal for controlling the output optical frequency of the local oscillator 260 (e.g., in case the local oscillator is a laser diode, by controlling the driving current). In this way the phase stochastic fluctuations and the frequency drifts are compensated for. As a result, the first electrical signal I is kept to carry the information related to the propagated DPSK signal while the second electrical signal Q is kept about zero.

The first electrical signal I is filtered by the low-pass narrowband electrical filter 270 so as to obtain an (analog) three-level electrical signal (−1, 0, +1). Thereafter, the filtered signal is squared by the electrical squarer 280, so as to obtain an analog two-level electrical signal (0, +1) which represents the de-coding of the DPSK optical signal and which has an improved extinction ratio and high dispersion robustness. After being squared, the squared signal is passed to the discriminating system wherein it is sampled with a sampling rate equal to the bit-rate R and with a clock recovered from the squared signal itself. The values of the samples are thereafter compared with a threshold in order to obtain a digital binary electrical signal (output data signal) which, apart from possible errors, corresponds to the binary data signal fed to the pre-coder at the transmitter side. The Applicant has found that the above three-level electrical signal is intrinsically robust to dispersion and such robustness is maintained in the two-level output data signal.

Figure 3:
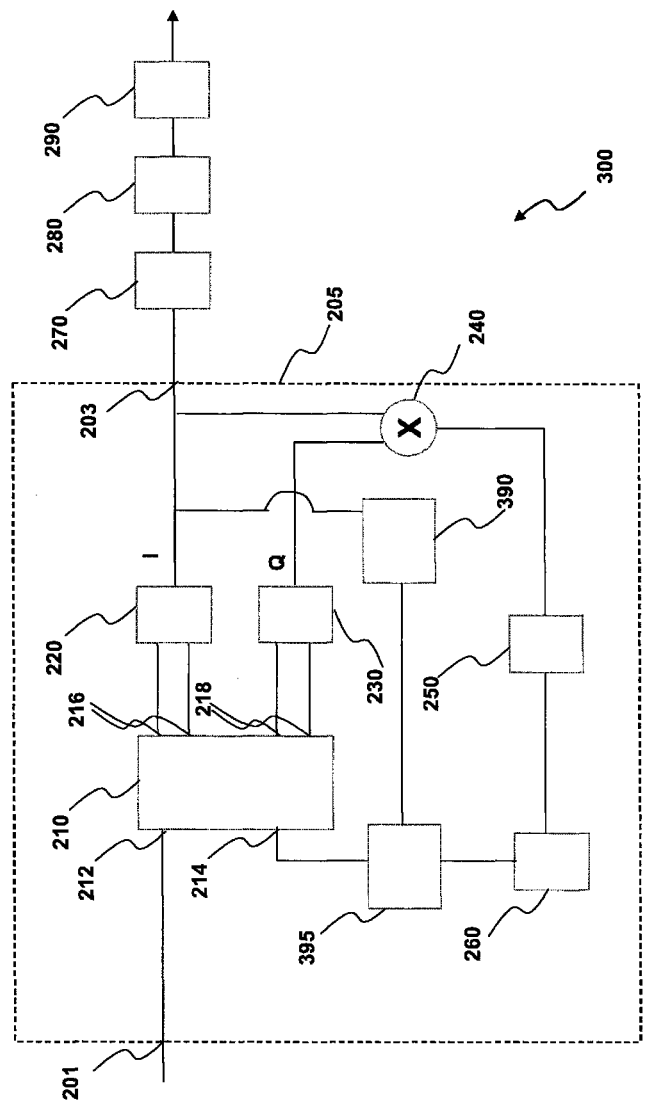
FIG. 3 is a schematic diagram showing in terms of functional blocks a variant of the first embodiment shown in FIG. 2.

FIG. 3 shows a schematic diagram of an optical receiving system 300 in accordance with a first variant of the first embodiment of FIG. 2. Throughout the present description and drawings, the same reference numeral is used for the same element. Reference is done to the description above for all the features already introduced above.

The optical receiving system 300 mainly differs from the receiving system 200 of FIG. 2 in that the polarization matching function of the polarization stabilizer 295 is here performed by a polarization transformer 395, of the type known in literature, acting on the optical radiation emitted by the local oscillator 260 so as to transform the fixed polarization of the optical radiation into a varying polarization having a stable relationship (typically coincident) to the one of the DPSK signal, so that the amplitude of the mixed signal is independent from the polarization of the DPSK optical signal. Therefore, the polarization transformer is optically interposed between the local oscillator and the optical hybrid 210. A controller 390 is electrically connected, by way of an electrically connecting line, to the output of the first photodetector 220 so as to receive in input the first electrical signal I and is operatively connected, e.g. by way of an electrical connecting line, to the transformer 395 so as to be able to drive the latter.

In use, the controller 390 receive in input the first electrical signal I which, being an AC signal, has zero mean and is amplitude modulated between two opposite values with rate equal to R. The controller processes the first signal I calculating its envelope and then low-pass filtering it with a filter bandwidth $B_c$ such that $1/\tau_{pol} \ll B_c \ll R$, wherein $\tau_{pol}$ is characteristic time of the fluctuations of the polarization. For DPSK optical signals having bit rate R greater than or equal to 2.5 Gbit/s, a typical value of $B_c$ lays in the interval between about 1 MHz and 50 MHz. The controller 390 then drives the polarization transformer 395 with a control signal, so as to maximize the above filtered envelope, for example using a known method of transforming a fixed polarization state into a varying polarization state matched to the one of the DPSK optical signal, such as for example in article "Polarization control for coherent fiber-optic systems using nematic liquid crystals" by S. H. Rumbaugh et al., Journal of Lightwave Technology, vol. 8, pages 459-465 (March 1990).

Figure 4:
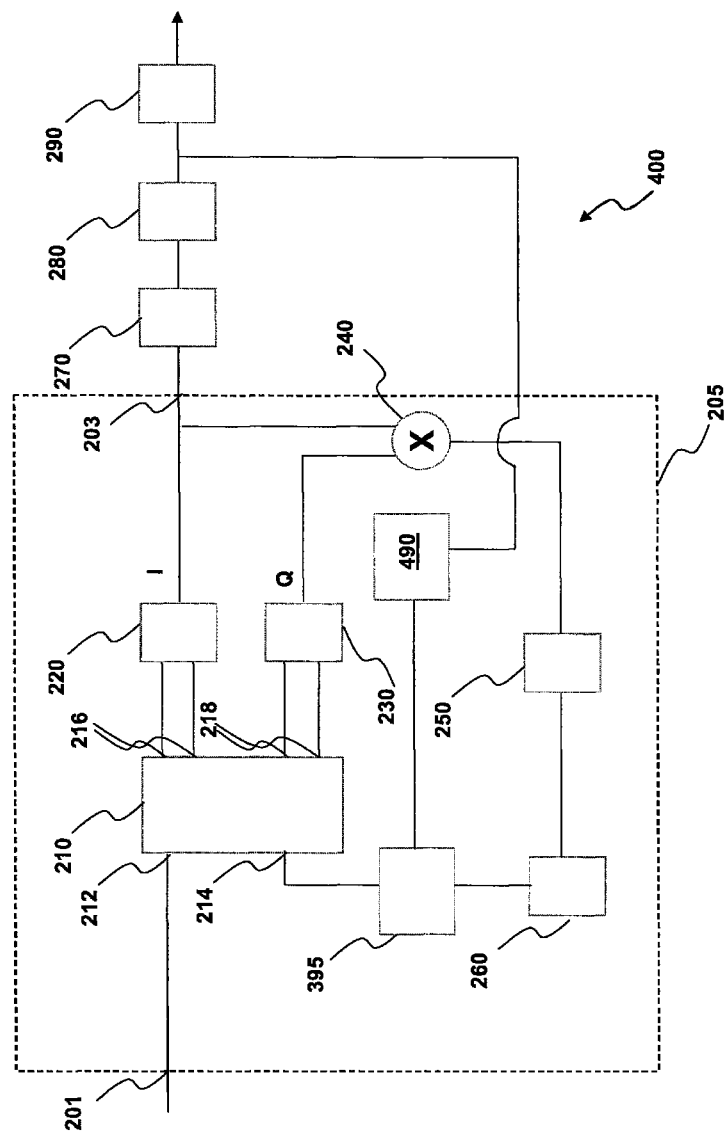
FIG. 4 is a schematic diagram showing in terms of functional blocks a further variant of the first embodiment shown in FIG. 2.

FIG. 4 shows a schematic diagram of an optical receiving system 400 in accordance with an alternative realization of the first variant of the first embodiment shown in FIG. 3. The main difference with respect to the example shown in FIG. 3 is that now the controller 490 is electrically connected to the output of the squarer 280. In use, the controller 490 receives in input the above squared electrical signal, low-pass filters it according to the preceding paragraph and then sends a feedback control signal to the polarization transformer 395 so as to maximize the low-pass filtered signal. The advantage of this configuration is that the above step of calculating the envelope is avoided, thanks to the fact of processing the squared electrical signal.

Figure 5:
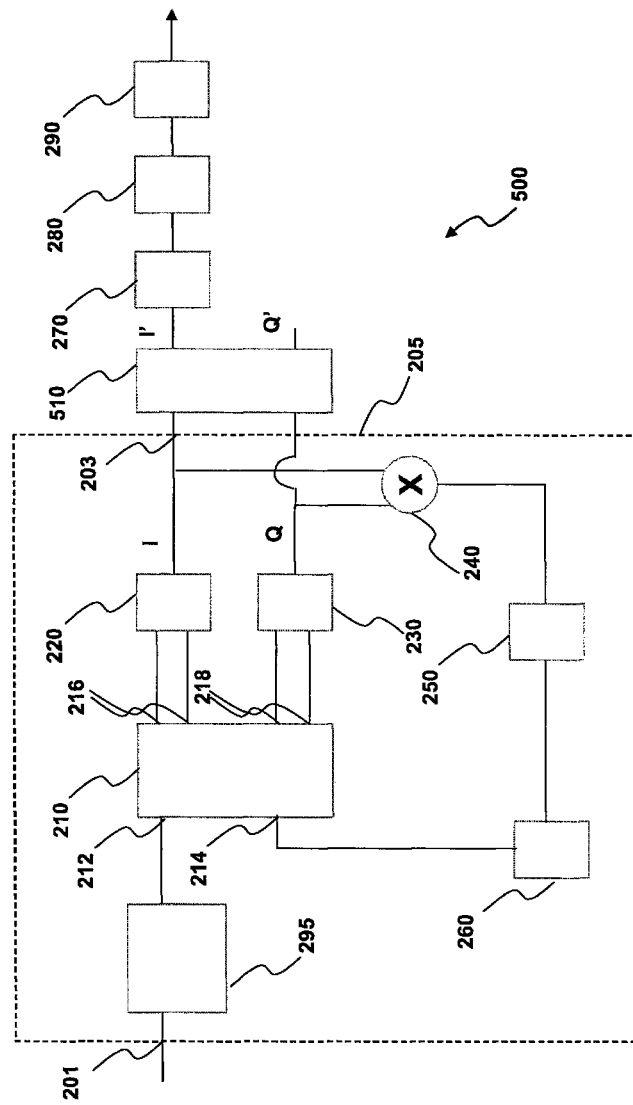
FIG. 5 is a schematic diagram showing in terms of functional blocks a still further variant of the first embodiment shown in FIG. 2.

FIG. 5 shows a schematic diagram of an optical receiving system 500 in accordance with a preferred realization of the first embodiment of FIG. 2. The main difference with the latter is that now an electrical (chromatic) dispersion compensator (EDC) 510 is placed downstream the photodetector(s) with respect to the direction of propagation of the electrical signals. Due to the linearity of both the EDC 510 and the filter 270, the EDC may be placed upstream (as shown in FIG. 5) or downstream (not shown) the filter 270, but in any case it is placed upstream the squarer 280. In the latter case (not shown) a pair of filters 270 are electrically interposed between the first photodetector 220 and the EDC 510 and, respectively, between the second photodetector 230 and the EDC 510 (in a configuration similar to the one shown in FIG. 7 below).

As regard the polarization matching system, it is possible to adopt either the solution shown in FIG. 5, contemplating the polarization stabilizer 295, or alternatively either one of the solutions shown in FIG. 3 or 4, contemplating the polarization transformer 395.

The EDC 510 is a linear analog base-band EDC based on electrical tapped delay-line equalizers or multi-tap transversal filters. A tapped delay-line equalizer (or N-tap transversal filter) contains N delay lines, each having a delay equal to an integer multiple of a given time period T, such integer multiple increasing by one unit when passing from one delay line to the successive one. Each delay line has a variable gain amplifier (VGA). The gains and the delays should remain substantially constant within the spectral bandwidth of the above narrow-band electrical filter 270. The analog tapped delay-line equalizer performs a linear combination of N replica of a signal component (in-phase or quadrature), the replica being retarded by a progressively increasing integer multiple of the given time period T.

Figure 6:
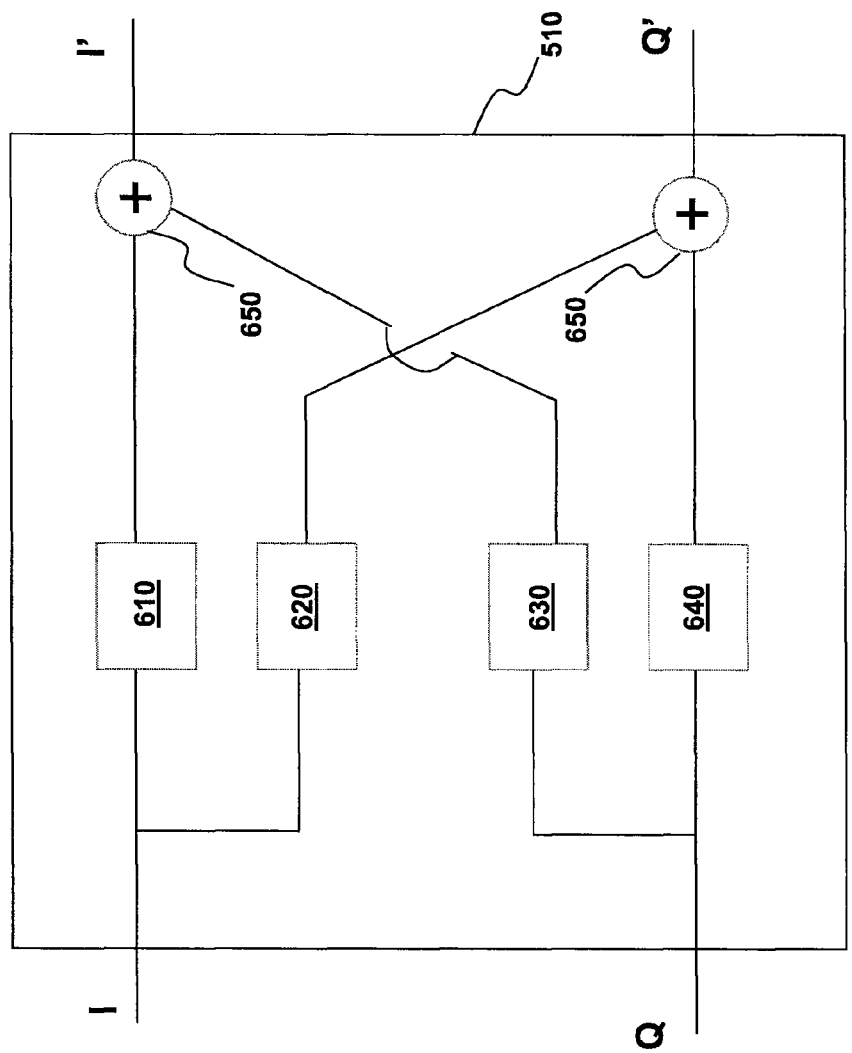
FIG. 6 is a schematic diagram showing in terms of functional blocks an exemplary embodiment of the electrical dispersion compensator shown in FIG. 5.

FIG. 6 shows in terms of functional blocks a schematic diagram of an exemplary base-band analog linear EDC 510. It comprises four tapped delay-line equalizers (or four N-tap transversal filters) 610, 620, 630 and 640 each synthesizing a respective transfer function, and a pair of adders 650. All four tapped delay-line equalizers are based on the same given time period T.

In use, the EDC 510 receives at its input ports respectively the above first (in-phase) and second (quadrature component) signals I and Q and transform them into output compensated signal I' and Q', even thought the latter is not used in the present embodiment, by implementing a transfer function which approximates the inverse of the transfer function, translated in base-band, given by the chromatic dispersion of the optical link 130. In this way an efficient compensation of the dispersion is obtained. The compensated in-phase quadrature signal I' is then filtered (filter 270), squared (squarer 280) and discriminated (290) as described above.

In case the EDC 510 is placed downstream the pair of filters 270, as described above, both the first and second components signals I and Q are first filtered in accordance with the present invention and then fed into the EDC in order to be processed as above.

Figure 22:
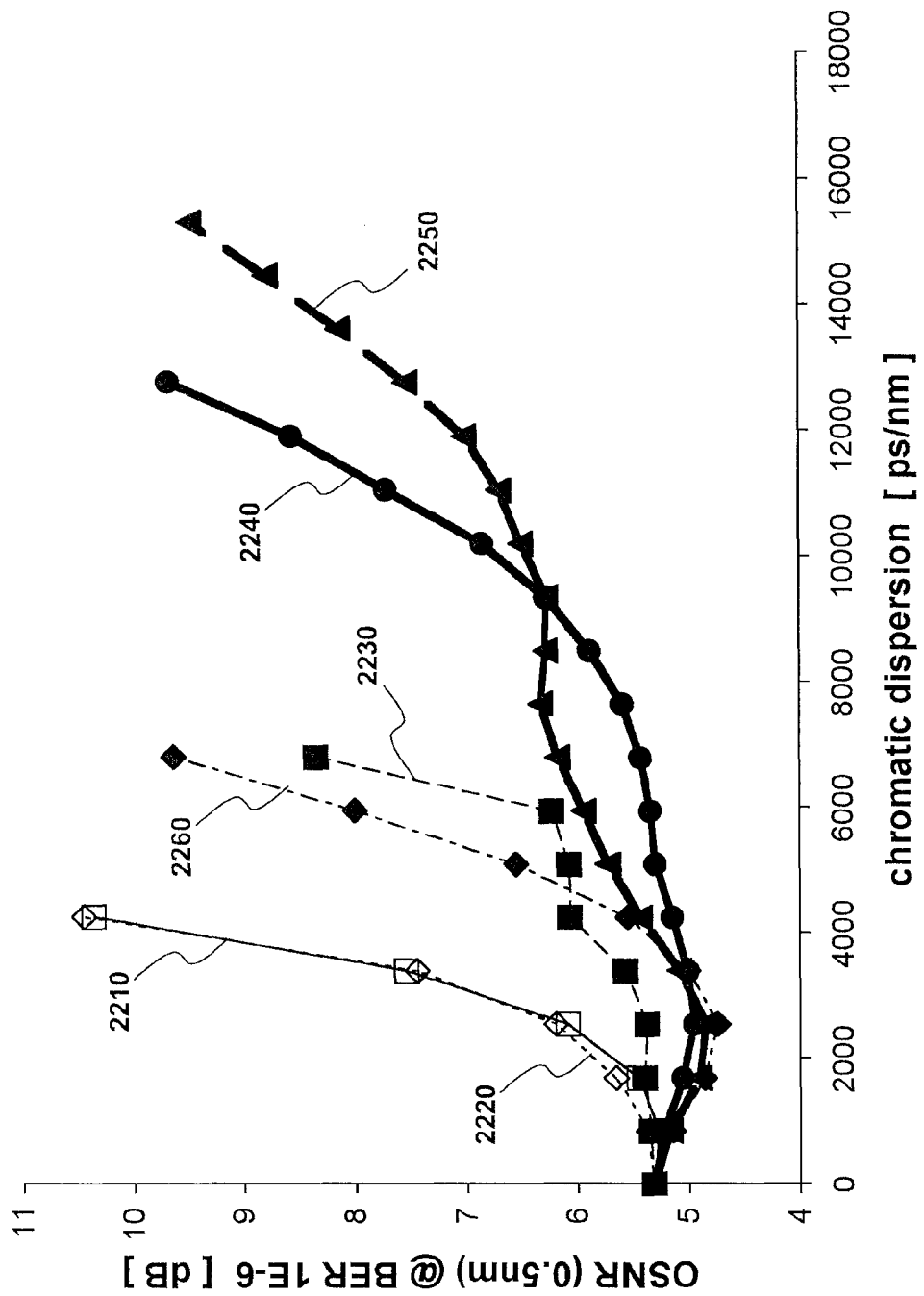

The Applicant has found that it is advantageous to choose the above given time period T equal to $T_{bit}=1/R$, being $T_{bit}$ the period of a bit of the DPSK optical signal. More in details, the Applicant has found that the choice of $T=T_{bit}$ for the above combination of a DPSK modulation format, a coherent receiver, a narrow-band electrical filter and a squarer, has proven to provide a greater robustness to the dispersion with respect to a comparative choice of $T=T_{bit}/2$, for the same number N of taps. With the above choice and N=9, it is possible to obtain a 'reach' (exemplary defined in correspondence of a 2 dB penalty due to the dispersion) of about 670 km of conventional SMF at 10 Gbit/s. The Applicant has also found that by slightly increasing over $T_{bit}$ the value of T it is possible to further extend the reach (e.g. 790 km of conventional SMF, with N=9 and T=1.15/R, as shown in FIG. 22).

Figure 7:
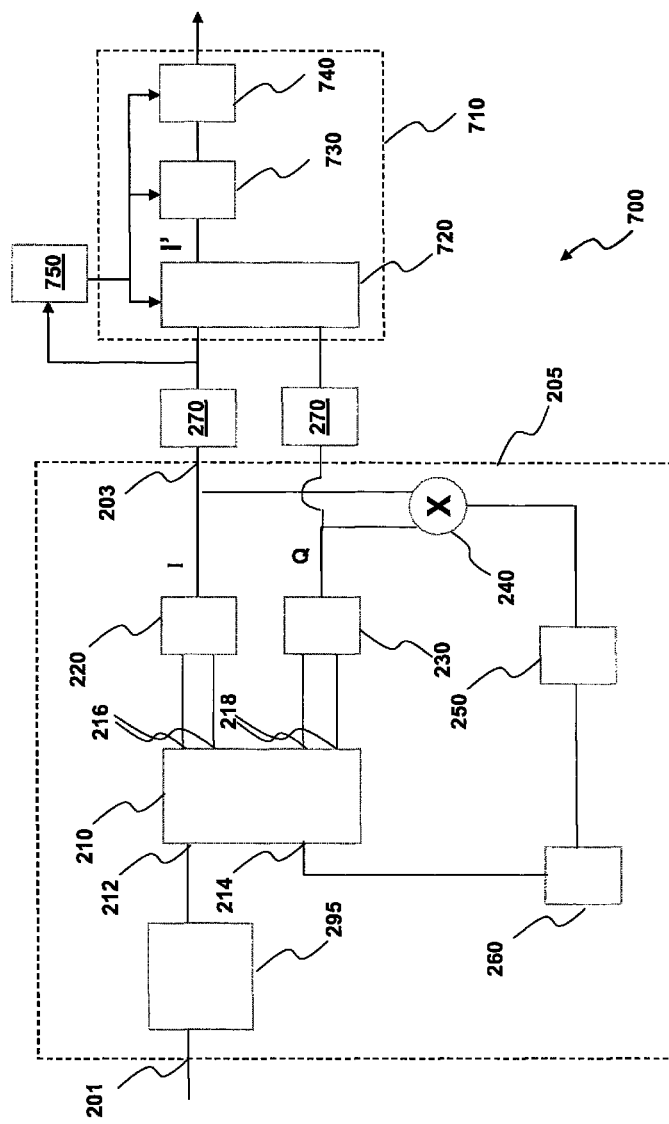
FIG. 7 is a schematic diagram showing in terms of functional blocks a still further variant of the first embodiment shown in FIG. 2.

FIG. 7 shows a schematic diagram of an optical receiving system 700 in accordance with a further realization of the embodiment of FIG. 5, with the difference that now the dispersion compensation is performed digitally instead of analogically.

A pair of filters 270, each one in all identical to the narrow-band filter 270 described above, are electrically connected to the output of respectively the first and second photodetectors 220, 230. A digital processor 710, e.g. of digital signal processor (DSP) type, has its two input ports connected to the output of the filters 270, respectively. The processor 710 comprises a digital EDC 720, a digital squarer 730 and a discriminator 740.

Figure 8:
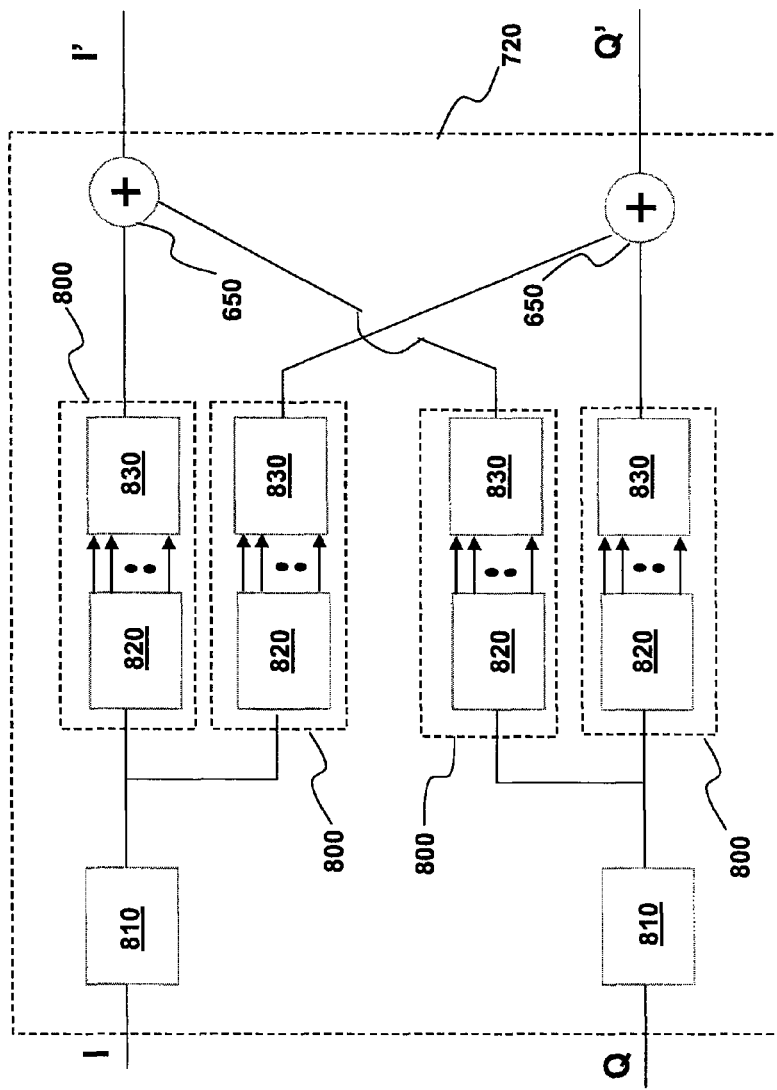
FIG. 8 is a schematic diagram showing in terms of functional blocks an exemplary embodiment of the electrical dispersion compensator shown in FIG. 7.

FIG. 8 shows in terms of functional blocks the scheme of the digital EDC 720. It comprises a pair of analog to digital converters 810 (ADC) respectively connected to the input ports of the EDC and respectively followed by a pair of digital tapped delay-lines or digital N-tap transversal filters 800. Each of the latter comprises a shift-register 820 (having N memory cells) and an equalizer 830.

Referring back to FIG. 7, a clock recovery circuit 750 is connected to the output of the first photodetector and is configured to distribute a clock recovered from the in-phase component of the received DPSK signal to the EDC 720, the squarer 730 and the discriminator 740.

In use, the above first (in-phase component) and second (quadrature component) signals I and Q are filtered by a respective low-pass narrowband filter 270 in accordance to the present invention. Preferably, each of the filter 270 has −3 dB double-side bandwidth greater than or equal to 0.44 R and lower than or equal to 0.68 R. More preferably, the −3 dB double-side bandwidth is greater than or equal to 0.50 R and lower than or equal to 0.62 R. Still more preferably, the −3 dB double-side bandwidth is greater than or equal to 0.54 R and lower than or equal to 0.58 R. Advantageously, the electrical filter is a $5^{th}$-order Bessel filter having −3 dB double-side bandwidth equal to about 0.56 R. The filtered components are then fed to the digital EDC 720 and sampled by the respective ADC 810 with a sampling rate S. The electrical pass-band of the ADCs should be large enough to comprise the spectral region wherein the filtered components are significantly different from zero, in order to avoid signal distortion. The sampled signals are then processed by the digital N-tap transversal filters 800 as shown in FIG. 8. Each of the N-tap transversal filters 800 runs an algorithm which processes contiguous sets of N samples, being N equal to the number of taps of the filter. The shift-register 820 stores in its N cells the N samples. The equalizer 830 then calculates, at a rate S, a linear combination of the N stored samples with coefficients chosen in accordance to the transfer function of the optical link 130. The clock recovery circuit 750 distributes the clock S recovered from the received DPSK signal to the EDC 720 (and the squarer 730 and the discriminator 740).

The Applicant has found that it is advantageous to choose the above rate S equal to the DPSK bit-rate R (synchronous equalizer). One advantage of this solution with respect to a digital fractionally spaced equalizer (wherein the rate S is a multiple of the bit-rate R) is that the required sampling and processing rate is lower, while extending the reach.

Figure 9:
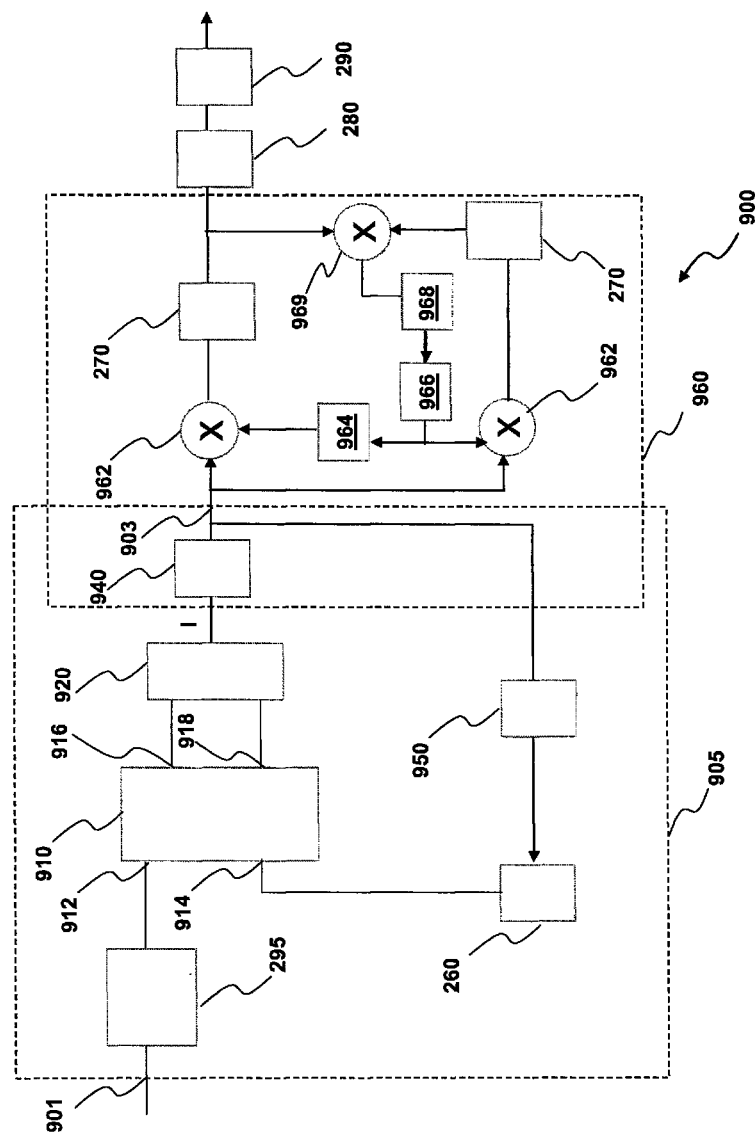
FIG. 9 is a schematic diagram showing in terms of functional blocks a second embodiment of the receiving system according to the present invention.

FIG. 9 shows a schematic diagram of an optical receiving system 900 in accordance with a second embodiment of the present invention.

The optical receiving system 900 comprises a heterodyne coherent optical receiving device 905 based on a heterodyne coherent receiving architecture. The receiving device 905 having an optical input port 901 optically connectable to the optical link 130 and an electric output port 903.

The coherent optical receiving device 905 comprises an optical hybrid 910 having a first input port 912 optically connected to the input port 901 and a second input port 914 optically connected to a local oscillator 260. The optical hybrid 910 further has a first output port 916 optically connected to a first input of a differential photodetector 920 and a second output port 918 optically connected to a second input of the differential photodetector 920, for outputting both in-phase (0° and 180°) components of the optical signal with respect to the local oscillator. The optical hybrid 910 of FIG. 9 is exemplarily a four-port 180° optical hybrid as shown in FIG. 10(a) of the Davis et al. article.

In an alternative configuration (not shown), the photodetector 920 is a single-input photodetector coupled to only one of the first and second output ports 916 and 918.

A wide-band electrical filter 940 is electrically connected to the output port 903 which in turn is electrically connected to the output port of the differential photodetector 920. The wide-band electrical filter 940 is a pass-band electrical filter centered at the intermediate frequency and having a −3 dB double-side bandwidth greater than R, in order to suppress the out-of-band noise. It is preferable that the wide-band filter 940 has a response sufficiently flat around the IF in order not to distort the signal.

A polarization stabilizer 295 as described above is optically interposed between the input port 901 of the coherent receiver 905 and the first input port 912 of the optical hybrid 910. In an alternative configuration, the polarization stabilizer is replaced by a polarization transformer and a controller as shown and described with reference to either FIG. 3 or FIG. 4.

Optionally, an optical frequency locking loop (OFLL) is envisaged, comprising an intermediate frequency (IF) locking circuit 950 electrically connected to the output of the filter 940 (or directly the output of the photodetector). In case the laser source at the transmitter side is sufficiently stable (e.g. having a drift less than about 0.2 R), the OFLL may advantageously be avoided.

The optical receiving system 900 further comprises an electrical circuit 960 for synchronous heterodyne demodulation. It comprises an electrical phase locked loop (EPLL) comprising, in addition to the wide-band electrical filter 940 above, a pair of multipliers 962, a 90° phase shifter 964, an oscillator 966, a loop filter 968 and a further multiplier 969. In accordance to an embodiment of the present invention, the receiving system further comprises a pair of narrow-band electrical filters 270. Each of the electrical filters 270 is a $5^{th}$-order Bessel low-pass filter having −3 dB double-side bandwidth equal to about 0.56 R, being R the bit-rate of the DPSK optical signal.

A squarer or 'square-law' device 280 and a discriminating system 290, of the kind described above, are electrically cascaded in the cited order downstream to the optical filter 270 with respect to the direction of propagation of the electrical signals.

In operation, the DPSK optical signal is received at the input port 901 of the coherent optical receiver 905 after having propagated along the optical link 130 and is mixed with the optical field coming from the local oscillator 260 by way of the optical hybrid 910. Before mixing, the input polarization state of the propagated DPSK optical signal is matched to that of the optical field of the local oscillator as described above.

The in-phase outputs (0° and 180°) at the output ports 916, 918 are received by the differential photodetector 920, which outputs an electrical signal which modulates an electrical carrier at a frequency equal to the difference between the optical frequency of the DPSK signal and the optical frequency of the local oscillator. The OFLL (950) controls the output optical frequency of the local oscillator 260 in such a way that the above difference is kept substantially constant close to a predetermined value called intermediate frequency (IF) value. The IF is selected between R and 3 R, preferably between 1.5 R and 2.5 R.

Figure 10:
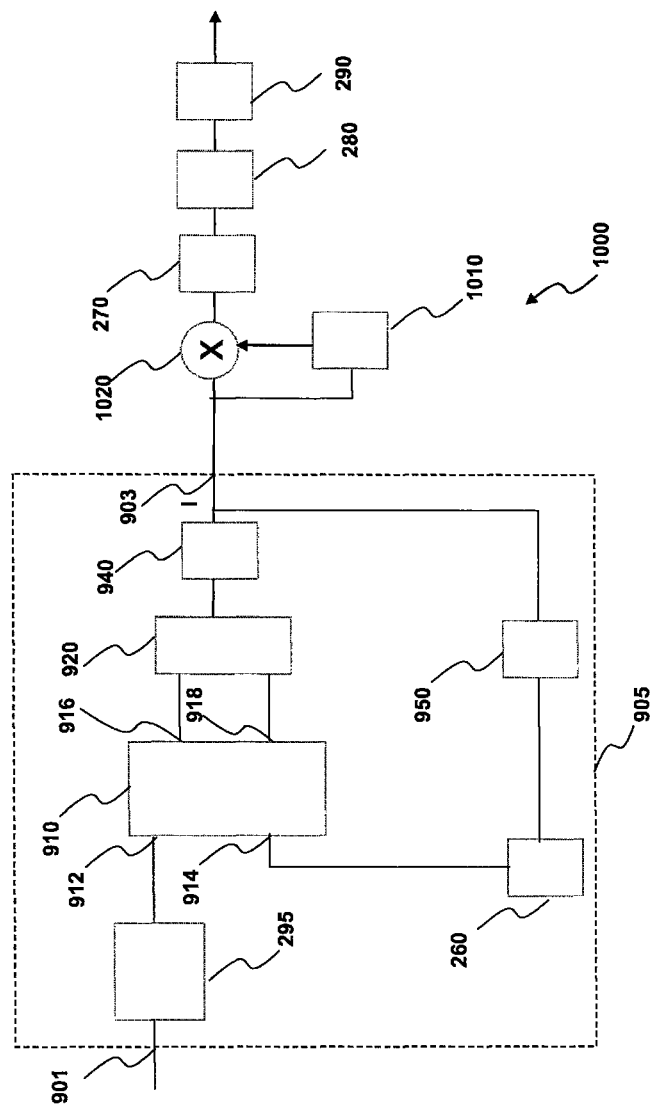
FIG. 10 is a schematic diagram showing in terms of functional blocks a variant of the second embodiment shown in FIG. 9.

The above electrical signal, which carries the information related to the propagated DPSK signal, is then fed to the electrical circuit 960 in order to be synchronously demodulated as known in the art. At the output of the circuit 960 an (analog) three-level base-band electrical signal (−1, 0, +1) is obtained. Thereafter, the filtered signal is squared by the electrical squarer 280, so as to obtain an analog two-level electrical signal (0, +1) which represents the de-coding of the DPSK optical signal and which has an improved extinction ratio and enhanced dispersion robustness. After being squared, the squared signal is passed to the discriminating system wherein it is processed as explained above. FIG. 10 shows a schematic diagram of an optical receiving system 1000 in accordance with a variant of the second embodiment of the present invention. The optical receiving system 1000 of FIG. 10 is based on synchronous demodulation comprising an IF carrier recovery circuit 1010. The latter is connected to the output of the wide-band filter 940. It comprises an electrical radio-frequency voltage controlled oscillator (RF-VCO) phase-locked through an EPLL suitable for PSK format (characterized by carrier suppression), such as for example a squaring loop 1010.

As regard the polarization matching system, either a polarization stabilizer 295, as shown in FIG. 10, or a polarization transformer 395, as shown in FIG. 3 or 4 may be used as described above.

In use, the above electrical signal is first filtered by way of the pass-band wide-band filter 940 (identical to the filter 940 of FIG. 9) centered on the intermediate frequency and then it is multiplied, by way of the multiplier 1020, by the carrier recovered from the electrical signal itself by the IF carrier recovery circuit 1010. The baseband electrical signal thus obtained is then filtered by a narrow-band low-pass filter 270 in accordance to the present invention, squared and discriminated as explained above. In case of a squaring loop 1010, the input electrical signal is first squared, pass-band filtered, multiplied by an electrical oscillator output signal and low-pass filtered by way of a loop filter in order to obtain a control of the emission frequency of the electrical oscillator. Finally, the carrier thus generated by the electrical oscillator is divided by 2 so as to obtain the recovered carrier.

Figure 11:
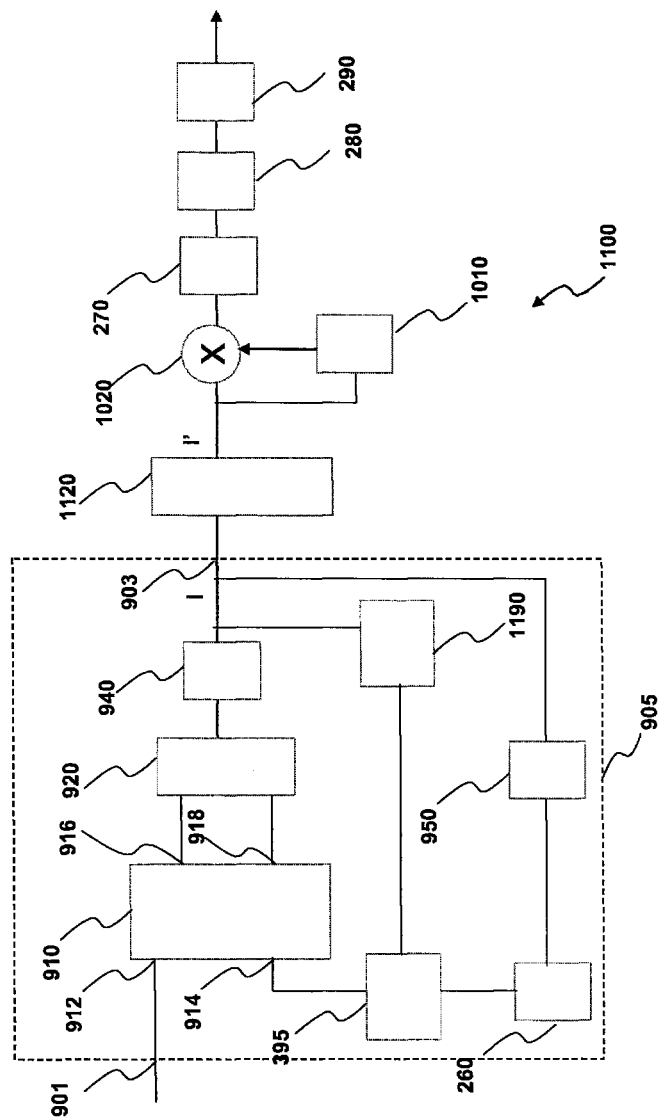
FIG. 11 is a schematic diagram showing in terms of functional blocks a further variant of the second embodiment shown in FIG. 9.

FIG. 11 shows a schematic diagram of an optical receiving system 1100 in accordance with the variant of the second embodiment of the present invention shown in FIG. 10, further provided with an EDC 1120 in order to improve the robustness to dispersion. The EDC 1120 is usable also in the receiving system 900 of FIG. 9. The EDC is an analog EDC having a pass-band centered around the IF. It is possible to provide a pass-band EDC 1120 based on tapped-delay line equalizers or N-tap transversal filters. In one realization, the EDC 1120 is realized by a tapped-delay line equalizer or an N-tap transversal filter, wherein for each tap both the gain and the phase shift are adjusted. In a further realization, the EDC 1120 is based on the scheme as shown in FIG. 2 of the cited Winters article, comprising a quadrature electrical hybrid and a pair of tapped-delay line equalizers or N-tap transversal filters having only the gains controllable.

In a still further realization, the pass-band EDC 1120 is realized by a dispersive microwave waveguide or a dispersive microstrip line, both having a suitable chromatic dispersion around the IF.

The Applicant has found that the combination of the DPSK modulation format, the coherent receiving device, the narrow-band electrical filtering and the squaring allows choosing the above time period T (equal to the delay between two successive taps) equal to $T_{bit}=1/R$ (synchronous tapped delay-line equalizer). Moreover, the Applicant has found that the choice of T comprised between 0.7/R and 1.4/R (including $T=T_{bit}$) for the above combination of a DPSK modulation format, a coherent receiving device, a narrow-band electrical filter and a squarer, has proven to provide a greater robustness to the dispersion with respect to an exemplary comparative choice of $T=T_{bit}/2$, for the same number N of taps (see also FIG. 22 below).

As regard the polarization matching system, either a polarization stabilizer 295 of the type shown in FIG. 2, or a polarization transformer 395 of the type shown in FIG. 3 or in FIG. 4, may be used as described above.

With reference to FIG. 11, a polarization transformer 395 is driven by a controller 1190 receiving in input the above electrical signal (of AC type centered at a frequency near IF). The operation of the controller 1190 and of the polarization transformer 395 is similar to that described for the controller 390 and the transformer 395 of FIG. 3.

Alternatively, when the scheme of FIG. 4 is adopted for the polarization matching system, the controller 1190 accepts in input the base-band signal after being squared. The operation of the controller 1190 and of the polarization transformer 395 is similar to that described for the controller 490 of FIG. 4.

Figure 12:
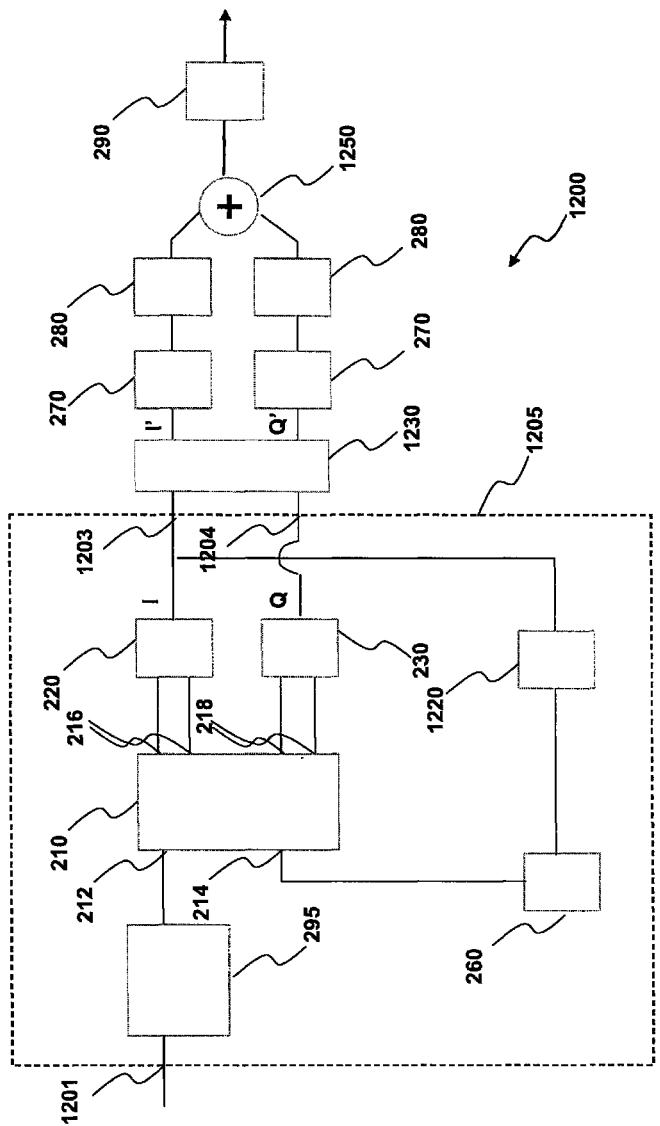
FIG. 12 is a schematic diagram showing in terms of functional blocks a third embodiment of the receiving system according to the present invention.

FIG. 12 shows a schematic diagram of an optical receiving system 1200 in accordance with a third embodiment of the present invention. The optical receiving system 1200 is comprised within the end apparatus 120 of FIG. 1. The optical receiving system 1200 comprises a phase diversity coherent optical receiving device 1205 having an optical input port 1201 optically connectable to the optical link 130 and a first and a second electric output port 1203, 1204.

The coherent optical receiving device 1205 comprises an optical hybrid 210, a local oscillator 260, a first and a second differential photodetector 220, 230 as shown and described with reference to FIG. 2. In an alternative configuration (not shown), the first and second photodetector 220 and 230 are single-input photodetector with AC output each one coupled to one output port of, respectively, the first and second pair of output ports 216 and 218, as described above.

In a still further alternative configuration, the optical hybrid 210 may be a six-port hybrid in combination to a third single-input photodetector.

Optionally, the coherent optical receiver 1205 further comprises an OFLL electrical circuit 1220 electrically connected to the output of the first photodetector 220 and to the input of the local oscillator 260. The OFLL circuit 1220 is configured to keep low (e.g. below 0.02 R) the frequency difference, in absolute value, between signal and local oscillator.

Two electrical filters 270 are electrically connected respectively to the output port 1203, which in turn is electrically connected to the output port of the first differential photodetector 220, and to the output port 1204, which in turn is electrically connected to the output port of the second differential photodetector 230. According to the present embodiment, each of the two electrical filters 270 is a low-pass filter having −3 dB double-side bandwidth comprised between 0.44 R and 0.68 R. Preferably, each electrical filter 270 is a $5^{th}$-order Bessel low-pass filter having −3 dB double-side bandwidth equal to about 0.56 R, being R the bit-rate of the DPSK optical signal.

Two squarers 280 are electrically connected respectively to the output port of the two electrical filters 270, and their output ports are both connected to an adder 1250. A discriminating system 290, of the kind described above, is connected to the output port of the adder 1250.

As regard the polarization matching system, a polarization stabilizer 295 is optically interposed between the input port 1201 of the coherent receiver 1205 and the first input port 212 of the optical hybrid 210. The polarization stabilizer 295 may be for example of the type described in patent application WO03/014811.

In operation, the received DPSK optical signal is polarization stabilized, mixed with the local oscillator 260 and photodetected as described with reference to the first embodiment of the present invention. The first photodetector 220 emits a first electrical signal I, which is directly proportional to an in-phase component of the DPSK optical signal with respect to the phase of the local oscillator, and the second photodetector 220 emits a second electrical signal Q, directly proportional to a quadrature component of the DPSK optical signal.

Since the local oscillator is not locked in phase to the DPSK signal (but possibly only in frequency), the stochastic fluctuations of the phase difference generates a stochastic rotation of the two-point (0°-180°) field constellation in the complex plane having axes I and Q.

Both the first electrical signal I and the second electrical signal Q are filtered by the respective low-pass narrowband electrical filter 270 in order to obtain a three-point field constellation stochastically rotating. Both the first and the second filtered electrical signal are thereafter squared by the respective squarer 280 and the squares are summed by the adder 1250, in order to eliminate the dependency from the above phase difference and to obtain a two-level electrical signal. The latter signal, i.e. the sum of the squared electrical signals at the output of the adder 1250, is thereafter fed to the discriminating system 290 as described above.

Optionally and preferably, the optical receiving system 1200 comprises an analog EDC 1230 having a pair of input port respectively connected to the output of the first and second photodetector 220, 230 and a pair of output port respectively connected to the input of the pair of filters 270. The analog EDC 1230 is, e.g., of the kind described with reference to FIG. 6. Preferably it is a synchronous EDC.

Due to the linearity of the EDC and the filters 270, it is possible to place the pair of filters 270 upstream the EDC with respect to the direction of propagation of the electrical signals (from left to right in figure).

Figure 13:
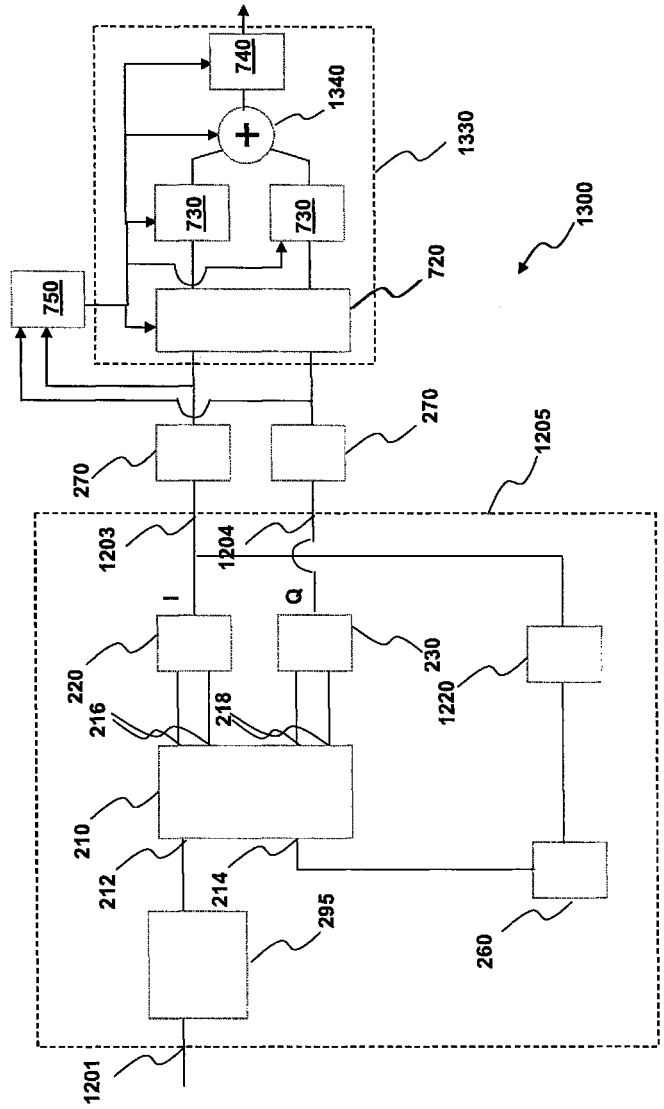
FIG. 13 is a schematic diagram showing in terms of functional blocks a variant of the third embodiment shown in FIG. 12.

FIG. 13 shows a schematic diagram of an optical receiving system 1200 in accordance with the third embodiment of the present invention shown in FIG. 12, wherein now the dispersion compensation is performed digitally instead of analogically.

A digital processor 1330, e.g. of DSP type, has its two input ports connected to the output of the filters 270, respectively. The processor 1330 comprises a digital EDC 720, of the kind described with reference to FIGS. 7 and 8, a pair of digital squarers 730, a digital adder 1340 and a digital discriminator 740.

A clock recovery circuit 750 is connected to the output of the first photodetector and is configured to distribute to the digital processor 1330 a clock recovered from the electrical signals I and Q (after or before filtering). Similarly to the above, the Applicant has found that it is advantageous to choose the above rate S equal to the DPSK bit-rate R (synchronous equalizer).

Figure 14:
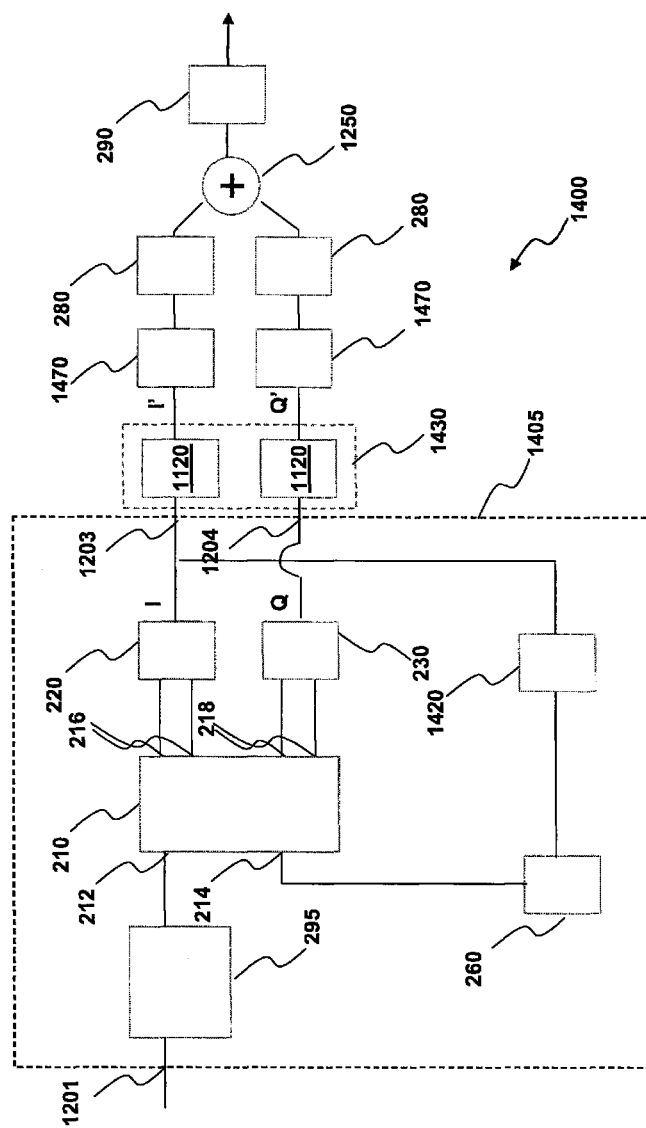
FIG. 14 is a schematic diagram showing in terms of functional blocks a further variant of the third embodiment shown in FIG. 12.

FIG. 14 shows a schematic diagram of an optical receiving system 1400 in accordance with a variant of the third embodiment of the present invention shown in FIG. 12.

In this variant, the OFLL 1420 is now configured for keeping the frequency difference in absolute value between the DPSK signal and the local oscillator equal to an intermediate frequency (IF) greater than R, preferably comprised between 1.5 R and 2.5 R. In this case, the narrow-band electrical filters 270 of the embodiment shown in FIG. 12 are replaced by a pair of pass-band electrical filters 1470 each centered at the IF and having −3 dB double-side bandwidth comprised between 0.44 R and 0.68 R. Preferably each of the pass-band electrical filter is a 5th order pass-band Bessel filter having −3 dB double-side bandwidth equal to 0.56.

Optionally and preferably, the optical receiving system 1400 comprises an analog EDC 1430 comprising a pair of separate analog pass-band EDCs 1120 of the kind described with reference to FIG. 11. Each of the pass-band EDC 1120 has an input port connected to the output of the respective photodetector 220, 230 and an output port connected to the input of the respective filter 1470. Due to the linearity of the EDC and the filters, it is possible to place the pair of filters 1470 upstream the EDC.

In use, both the electrical signals I and Q coming from the photodetectors are frequency translated at a central frequency near the IF. Each of the pass-band EDC 1120 acts separately on the respective signal I and Q, emitting the compensated signal I' and Q'.

As regard the polarization matching system for the third embodiment (in all its variants) of the invention, several schemes may be adopted in addition to the one shown in FIGS. 12-14.

Figure 15:
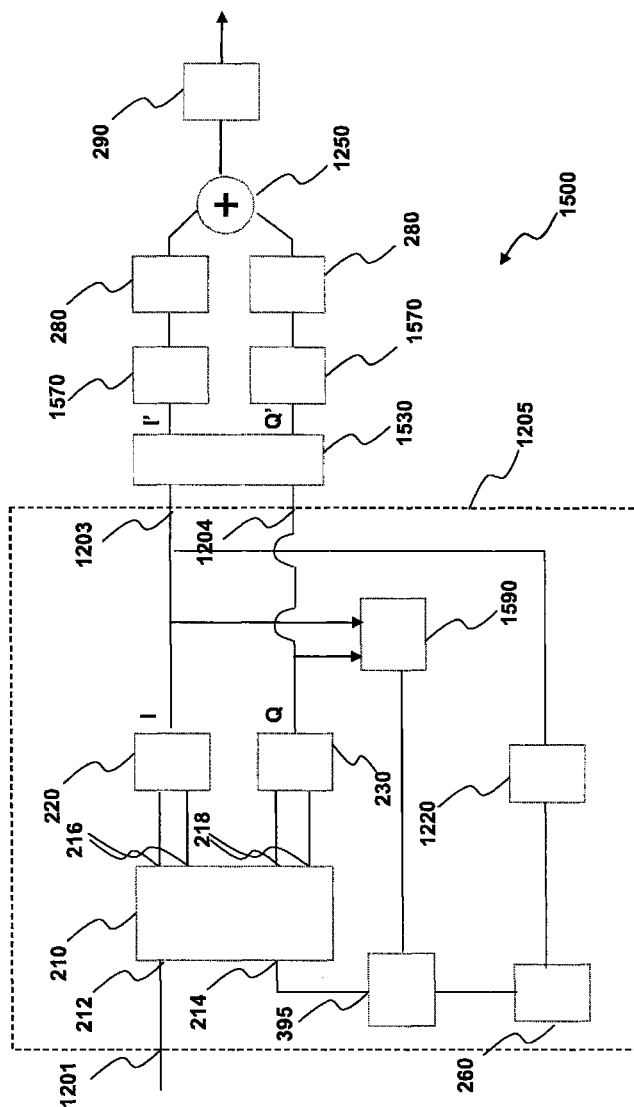
FIGS. 15 and 16 are schematic diagrams showing in terms of functional blocks still further variants of the third embodiment shown in FIG. 12.

FIG. 15 shows one of the possible polarization matching schemes suitable to all the variants shown in FIGS. 12, 13 and 14. In this respect, the narrow-band filters 1570 may be either the low-pass filter 270 of FIGS. 12 and 13 or the pass-band filters 1470 of FIG. 14 and the optional EDC 1530 may be either the low-pass EDC 1230 of FIG. 12 or the pass-band EDC of FIG. 14. Alternatively to the EDC, the DSP 1330 of FIG. 13 may be optionally employed.

In FIG. 15 the polarization matching function is performed by a polarization transformer 395, of the type described above (see e.g. FIGS. 3 and 4), acting on the optical radiation emitted by the local oscillator 260 so as to transform the fixed polarization of the optical radiation into a varying polarization having a stable relationship (typically coincident) to the one of the DPSK signal. A controller 1590 has its input ports electrically connected respectively to the output of the first and second photodetector 220,230 so as to receive in input at least one of the first and second electrical signal I and Q and has its output port operatively connected, e.g. by way of an electrical connecting line, to the transformer 395 so as to be able to drive the latter.

In use, in the variant of the third embodiment wherein the frequency difference in absolute value between local oscillator and DPSK signal is kept by the OFLL 1220 near the IF, as explained with reference to FIG. 14, the controller 1590 receives in input at least one (preferably only one) of the AC electrical signals I and Q (phase modulated 0°-180° at rate R and frequency translated around IF). The controller calculates its envelope and then low-pass filters it with a filter bandwidth Bc such that $1/\tau_{pol} \ll B_c \ll R$, wherein $\tau_{pol}$ is the characteristic time of the fluctuations of the polarization. For DPSK optical signals having bit rate R greater than or equal to 2.5 Gbit/s, a typical value of Bc lays in the interval between about 1 MHz and 50 MHz.

In the variant of the third embodiment wherein the frequency difference in absolute value, called $f_{offset}$, between local oscillator and DPSK signal is kept by the OFLL 1220 less than 0.02 R, see FIGS. 12 and 13, then it is preferable that such frequency difference is kept by the OFLL different from zero, such that $1/\tau_{pol} \ll B_c \ll f_{offset} \ll R$. Being $\tau_{pol}$ typically greater than 1 ms, when R is greater than or equal to 2.5 Gbit/s it is advantageous to select $f_{offset}$ in the interval between 20 MHz and 50 MHz and Bc not greater than about 1 MHz. In this case, advantageously the controller 1590 may receive in input only one of the AC electrical signals I and Q.

In both the above variants, the controller 1590 drives the polarization transformer 395 with a control signal, so as to maximize the above filtered envelope as explained above.

Figure 16:
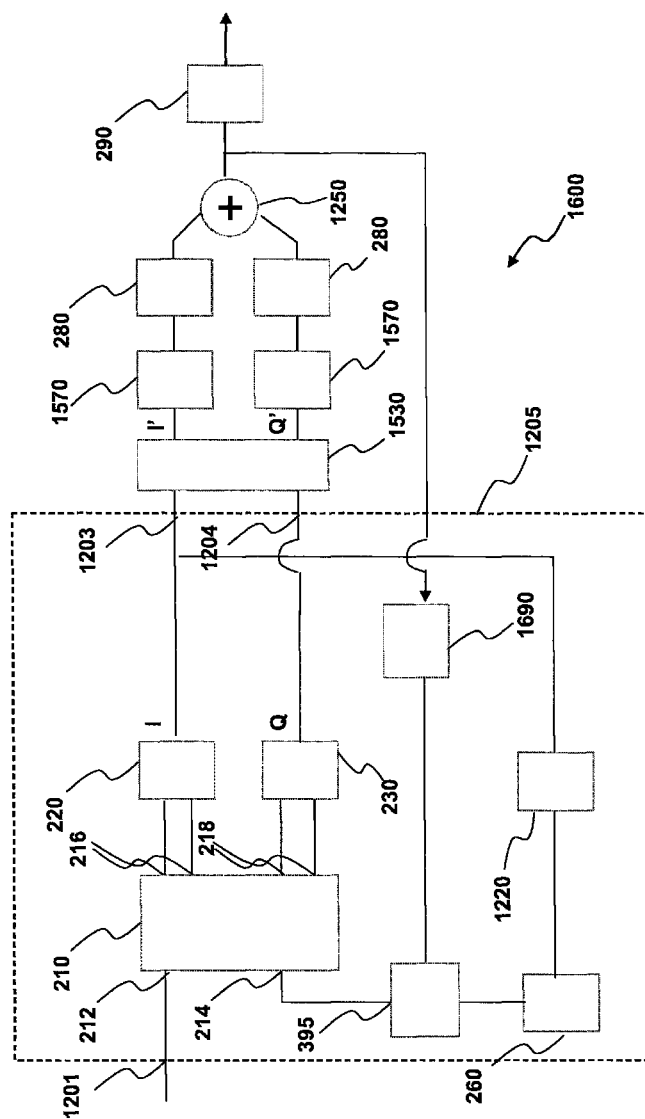
Figure 17:
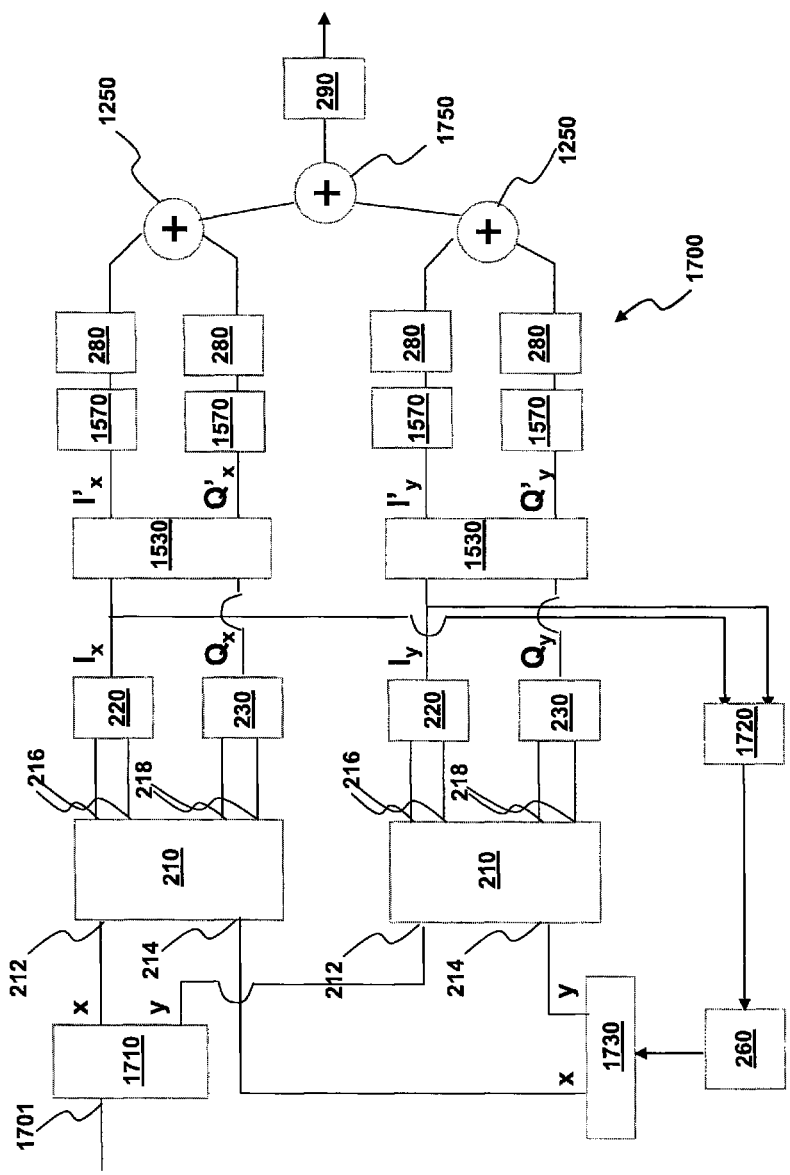
FIG. 17 is a schematic diagram showing in terms of functional blocks a still further variant of the third embodiment shown in FIG. 12.

FIG. 16 shows another of the possible polarization matching schemes suitable to all the variants shown in FIGS. 12, 13 and 14. The main difference with respect to the example shown in FIG. 14 and described above is that now the input port of the controller 1690 is electrically connected to the output of the adder 1250. In use, the controller 1690 receives in input the above sum of squared electrical signals, low-pass filters it and then sends a feedback control signal to the polarization transformer 395 so as to maximize the low-pass filtered signal. FIG. 17 shows a further possible polarization matching scheme (based on polarization diversity) suitable to all the variants shown in FIGS. 12, 13 and 14, without the polarization stabilizer 295.

Here, the polarization matching system comprises an optical polarization splitter 1710 having its optical input port 1701 optically connected to the link 130. For example, the splitter 1710 may be a polarizing beam splitter (PBS) in free-space or a planar lightguide circuit (PLC) polarization splitter in integrated optics. The splitter 1710 has a pair of output ports for outputting respectively two components of the propagated DPSK optical signal having polarizations x and y, for example orthogonal. Each of the two output ports x and y of the splitter 1710 is connected to the first input port 212 of a respective optical hybrid 210. Each of the optical hybrid 210 is then connected to a cascade of elements (photodetectors 220, 230, optional EDC 1530, narrow-band filters 1570, which have according to the present invention −3 dB double-side bandwidth comprised between 0.44 R and 0.68 R, squarers 280 and adder 1250) as described with reference to FIGS. 12, 13 and 14. A further adder 1750 has its input ports connected to the output of the two adder 1250 and its output port to the discriminating system 290.

A single local oscillator 260 is optically connected to the input port of a further optical polarization splitter 1730, similar to the splitter 1710, which in turn has its pair of output ports respectively connected to the respective second input port 214 of one of the two optical hybrids 210, for outputting respectively two components of the oscillator field having the same above polarizations x and y. The polarization of the field of the local oscillator is oriented so that it is split in the two polarized components x and y having equal power.

Optionally, a OFLL 1720 has its two input ports connected to the output port of the two first photodetectors 220, respectively, and its output port connected to the local oscillator 260 so as to control its emission frequency.

In use, the propagated DPSK optical signal is received at the input port 1701 of the polarization splitter and is split in its two orthogonally polarized components x and y, which are then coherently received in accordance to the description above (see FIGS. 12 and 14). The two electrical signal thus obtained are summed up at the element 1750 and the result is then discriminated. The field of the local oscillator is split in its two (orthogonally) polarized components x and y, so that each of the hybrid 210 mixes the same polarization component of the signal and local oscillator. In case the hybrid is in integrated optics (such as a PLC hybrid), then it is preferable that the splitter 1710 is a polarization splitter and rotator so that the two polarizations x and y are coincident. In this case the splitter 1730 may simply be a 3 dB beam splitter.

Figure 18:
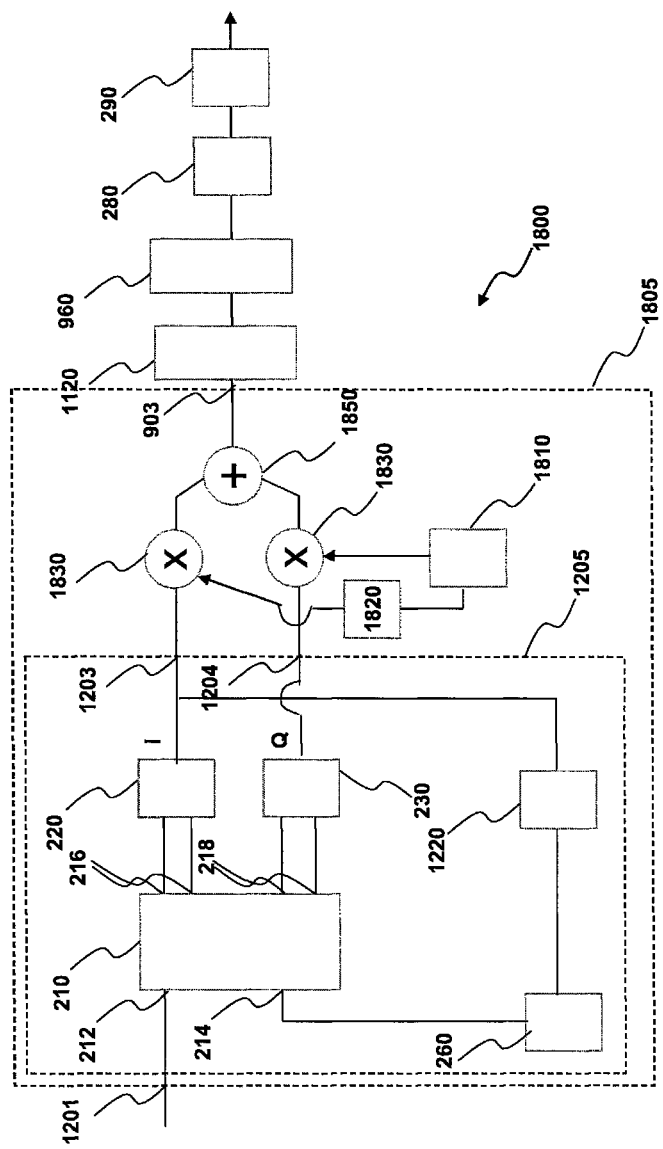
FIG. 18 is a schematic diagram showing in terms of functional blocks a fourth embodiment of the receiving system according to the present invention.

FIG. 18 shows a schematic diagram of an optical receiving system 1800 in accordance with a fourth embodiment of the present invention. The optical receiving system 1800 is comprised within the end apparatus 120 of FIG. 1. The optical receiving system 1800 comprises a heterodyne coherent optical receiving device 1805 based on a double-stage phase diversity coherent receiving architecture. The receiving device 1805 comprises a phase diversity coherent optical receiving device 1205 in all similar to the one described with reference to FIGS. 12 and 13. The heterodyne coherent optical receiving device 1805 also comprises an IF electrical local oscillator 1810 (second-stage) for sending an IF signal and its replica, phase shifted by 90° by way of a 90° phase shifter 1820, respectively in input to a pair of multipliers 1830. The latter are also connected respectively to the output port of the pair of photodetectors. An adder 1850 is connected to receive in input the output of the multipliers 1830 and to output their sum at the output port 903. Connected to the latter, a synchronous heterodyne demodulator 960, a squarer 280 and a discriminating system 290 are connected in cascade. The elements 280 and 290 are of the kind previously described, in accordance to the present invention. The electrical circuit 960 for synchronous heterodyne demodulation is configured for shifting back the signal at base-band. It may exemplarily be the same as of the EPLL 960 shown in FIG. 9, which comprises a pair of low-pass filters 270 in accordance to the present invention. Alternatively to the EPLL 960, an IF carrier recovery circuit 1010 may be employed, together with the multiplier 1020, the pass-band filter 940 and the low-pass filter 270 as shown in FIG. 10.

Optionally, a pass-band analog EDC 1120 of the kind described with reference to FIG. 11 may be employed as shown in FIG. 18.

As regard the polarization matching system, either a polarization stabilizer 295 (not shown) or a polarization transformer 395 (not shown) may be employed as previously described.

In use, the received DPSK optical signal is polarization matched, mixed with the local oscillator 260 and photodetected as described with reference to the first and third embodiments of the present invention, in order to obtain the above first electrical signal I and second electrical signal Q. The second stage (elements 1810, 1820 and 1830) then shifts both the signals at the intermediate frequency IF, comprised between 1.5 R and 2.5 R, thus obtaining an electrical signal at a central frequency near the IF in all similar to the one obtained by the heterodyne coherent receiver 905 of FIGS. 9-11 without the pass-band wide-band filter 940. Thereafter, the signal, possibly dispersion compensated by the pass-band EDC 1120, in case it is present, is shifted back to base-band by the heterodyne demodulator 960, comprising the narrow-band filtering in accordance to the present invention. The subsequent processing (squaring and discriminating) is thereafter the same as previously described.

Unless the optical sources of the transmitter side and the local oscillator are per-se sufficiently stable in frequency, the OFLL 1220 operates to keep low the frequency offset (below 0.02 R).

Figure 19:
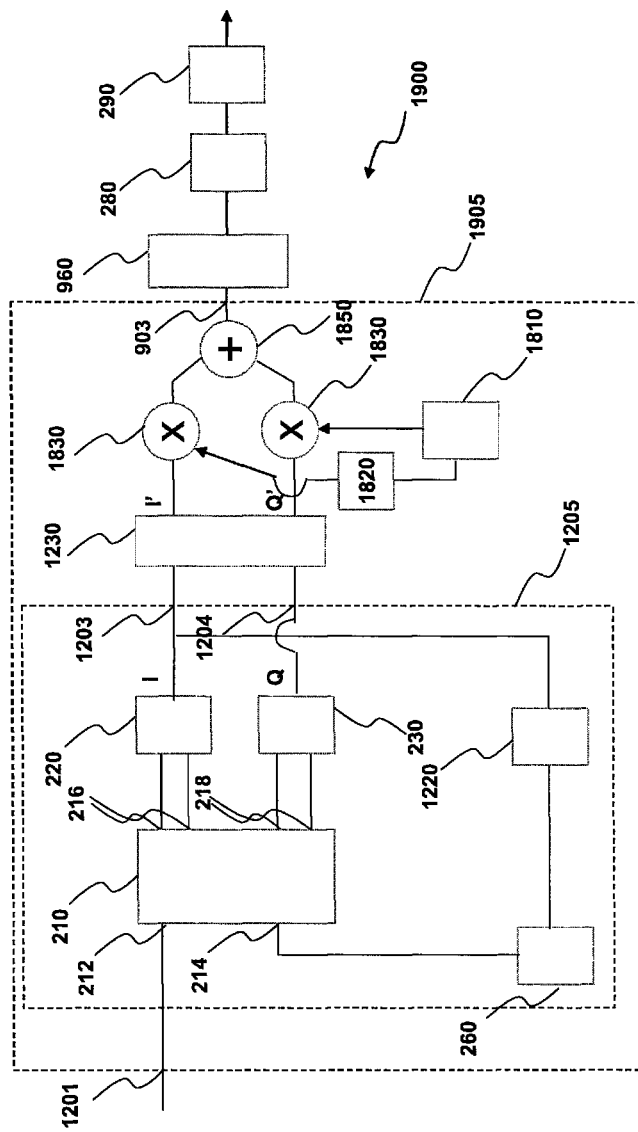
FIG. 19 is a schematic diagram showing in terms of functional blocks a variant of the fourth embodiment shown in FIG. 2.

FIG. 19 shows a schematic diagram of an optical receiving system 1900 in accordance with a variant of the above fourth embodiment of the present invention, wherein now the optional dispersion compensation is performed by a baseband analog EDC 1230, placed between the phase diversity receiver 1205 and the multipliers 1830. The base-band EDC 1230 is configured and operates as described with reference to FIGS. 5, 6 and 12.

Figure 20:
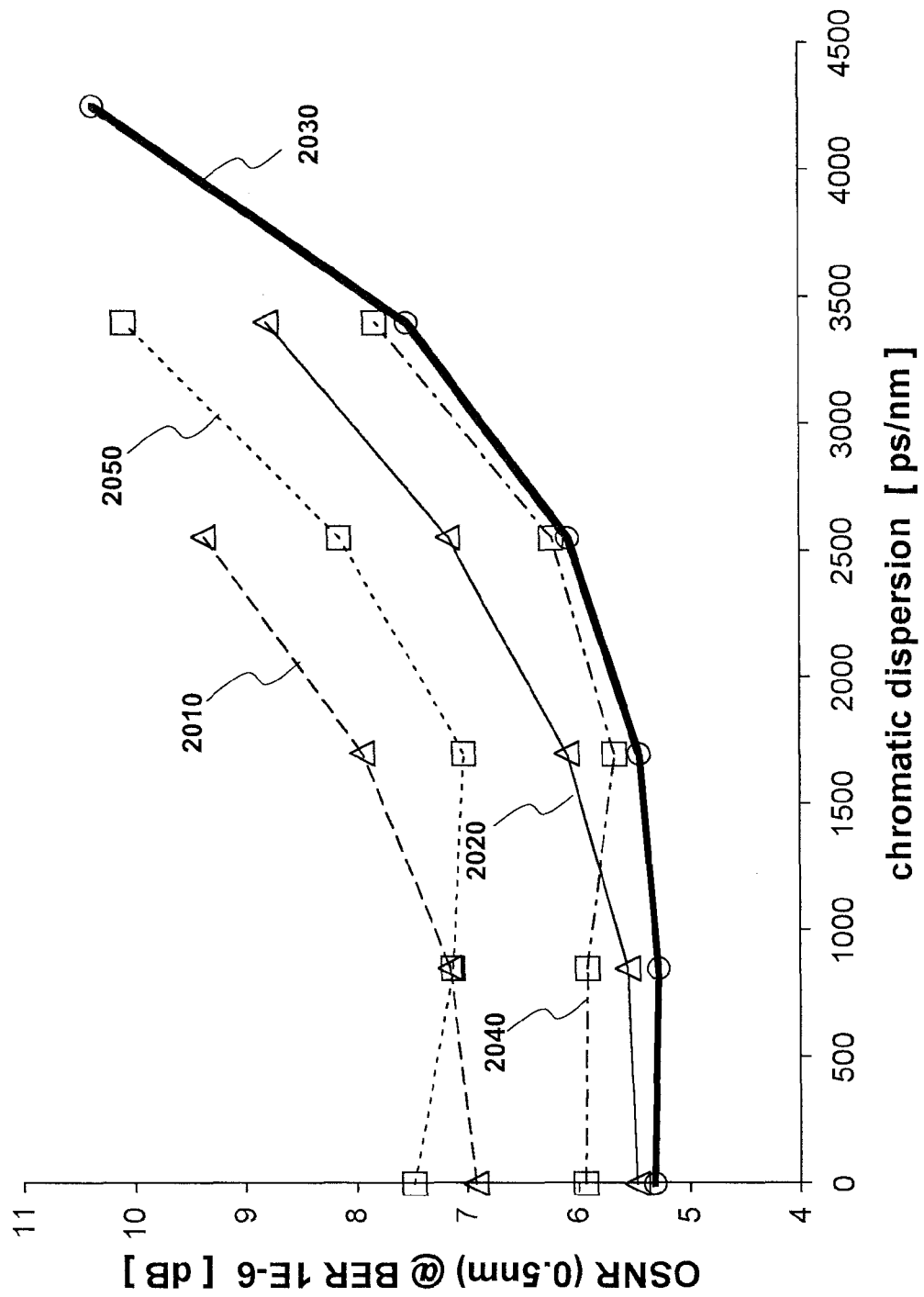
FIGS. 20, 21 and 22 show numerical results of calculated performances of the third embodiment of the present invention.
Figure 21:
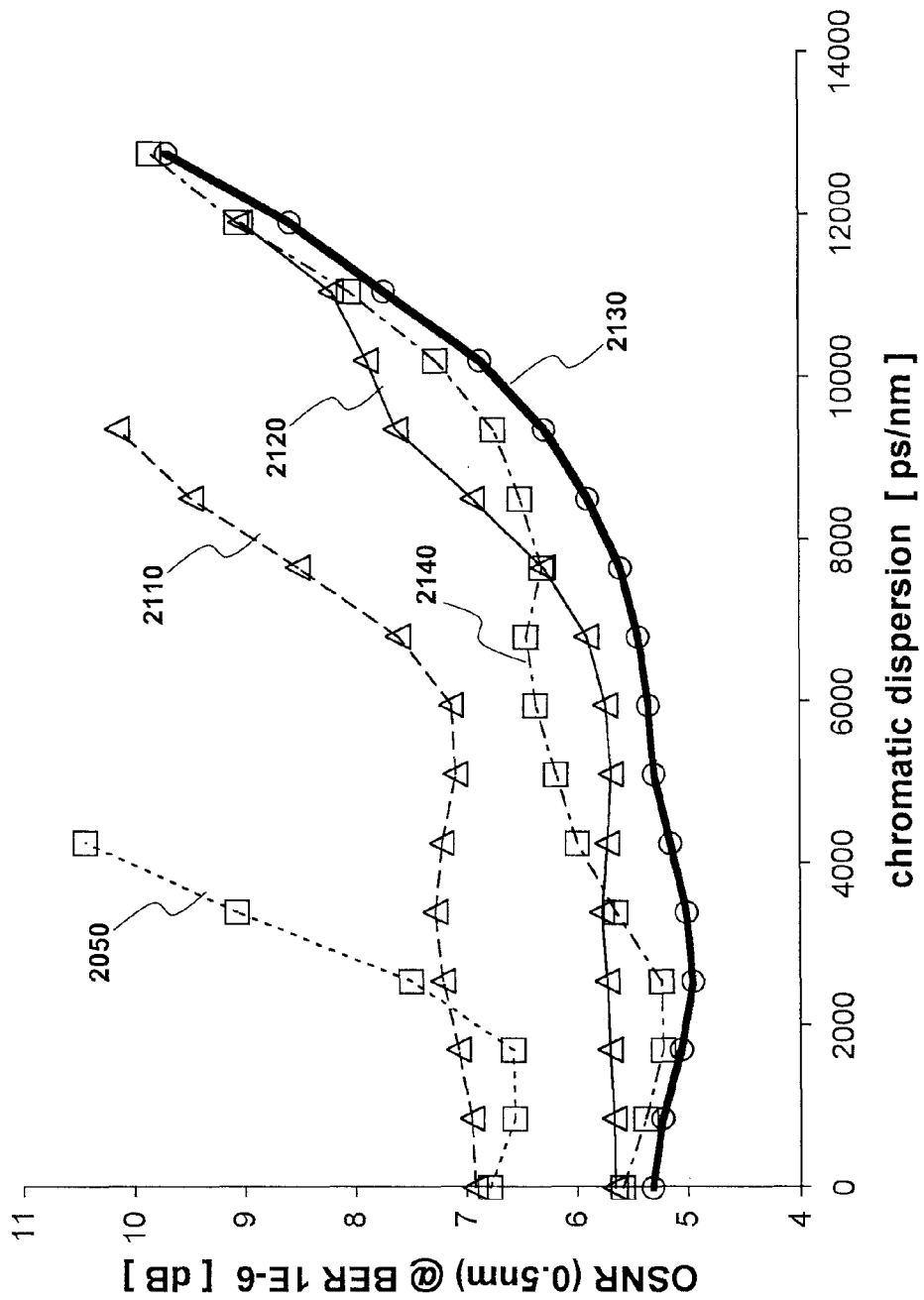

FIGS. 20, 21 and 22 show the optical signal to noise ratio (OSNR) versus the dispersion accumulated along the optical link 130 in various configurations of the optical communication system 100. The graphs shown are results of numerical simulations run by the Applicant, considering a NRZ-DPSK modulation format with a bit-rate R equal to 10 Gbit/s, and the receiving system 1200 as the one shown in FIG. 12 (based on a phase-diversity scheme). The OSNR shown is defined as the OSNR, at a resolution equal to 0.5 nm, needed in order to obtain a bit error rate (BER) equal to $10^{-6}$, in the hypothesis that the dominant noise comes from the amplified spontaneous emission (ASE) of the optical amplifiers 140 along the optical link.

FIG. 20 shows the above OSNR corresponding to a double-side −3 dB bandwidth of the narrow-band 5th order Bessel filters 270 respectively equal to 4.0 Ghz (dashed curve 2010), 4.8 Ghz (thin continuous curve 2020), 5.6 Ghz (thick continuous curve 2030), 6.8 Ghz (dash-dotted curve 2040) and 9.0 Ghz (dotted curve 2050), without the EDC 1230. As can be seen, the optimal value of the filter bandwidth lays between about 4.4 Ghz and 6.8 GHz.

FIG. 21 shows the above OSNR corresponding to a double-side −3 dB bandwidth of the narrow-band Bessel filters 270 respectively equal to 4.0 Ghz (dashed curve 2110), 4.6 Ghz (thin continuous curve 2120), 5.6 Ghz (thick continuous curve 2130), 6.2 Ghz (dot-dashed curve 2140) and 8.0 Ghz (dotted curve 2150), in presence of a synchronous (T=100 ps) EDC 1230 with 9 taps.

FIG. 22 shows the above OSNR corresponding to a double-side −3 dB bandwidth of the narrow-band Bessel filters 270 equal to 5.6 Ghz, respectively without EDC (thin continuous curve 2210), with a fractionally spaced (T=50 ps) 9-tap EDC (dotted curve 2220), with a 9-tap EDC having T=70 ps=0.7/R (dashed curve 2230), with a synchronous (T=100 ps) 9-tap EDC (thick continuous curve 2240), with a 9-tap EDC having T=115 ps (thick dashed curve 2250) and with a 9-tap EDC having T=140 ps=1.4/R (dot-dashed curve 2260). As can be seen, in absence of EDC the scheme of the present invention allows a reach (defined as 2 dB of additional penalty) of about 3200 ps/nm, far greater than traditional on-off keying (OOK) direct detected system. Moreover, a fractionally spaced EDC leaves substantially unaltered the dispersion robustness, while the choices of T=100 ps and T=115 ps allows a reach of respectively 10700 ps/nm (corresponding to about 670 km of conventional fiber) and 12600 ps/nm (790 km of fiber).

It is noted that the same numerical results shown in FIGS. 20-22 are obtained considering a homodyne receiver 205 as shown in FIG. 2 with an ideal optical PLL.

Figure 23:
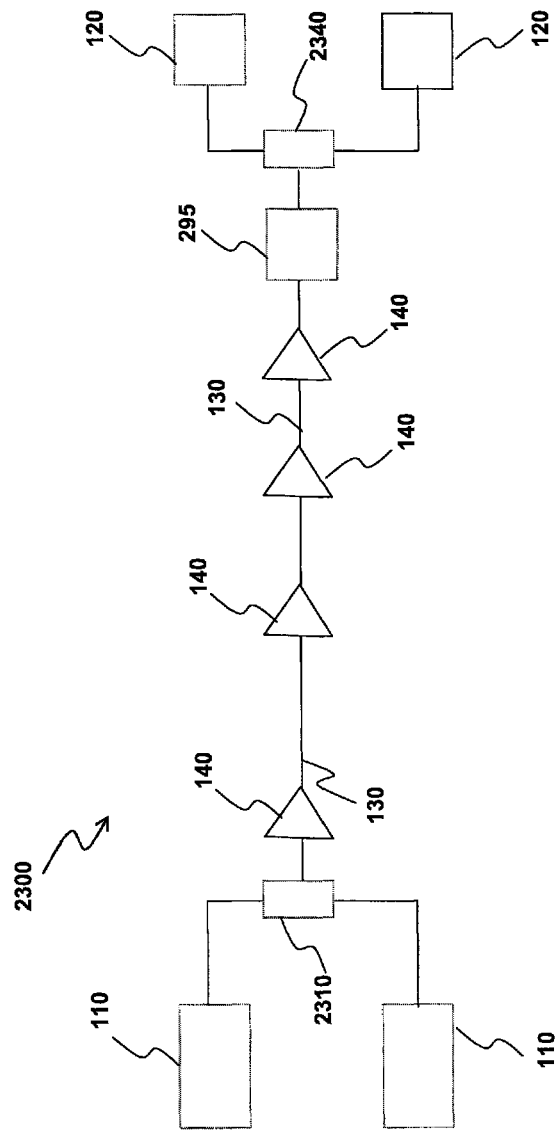
FIG. 23 schematically shows in terms of functional blocks a further exemplary optical communication system according to the present invention.

FIG. 23 shows a schematic diagram of a polarization division multiplexing (PolDM) optical communication system 2300 according to a further embodiment of the present invention. Here, a pair of the above transmitters 110 are followed by a polarization combiner 2310 apt to multiplex the two DPSK optical signals received respectively by the two transmitters 110, in an orthogonal relationship of their optical polarizations. At the opposite end of the optical link 130, a polarization stabilizer 295 of the kind described above is followed by a polarization splitter 2340. A pair of the above end apparatuses 120 is connected to the two output ports of the splitter 2340 in order to receive a single DPSK optical signal.

In use, the polarization combiner multiplexes together the two DPSK optical signals with an orthogonal relationship. Preferably, the two DPSK optical signals are RZ-DPSK signals, and they are time-interleaved in the resulting PolDM optical signal. After propagating along the link 130, the polarization stabilizer aligns the PolDM optical signal to the polarization splitter 2340, so that the latter separates the two single DPSK signals and send them respectively to a respective end apparatus 120 in accordance to the present invention. It is noted that in this case each of the end apparatus 120 has in input a DPSK signal already stabilized in polarization, so that no further polarization matching system is required.

In case the end apparatuses 120 are based on synchronous heterodyne receivers (FIGS. 9-11), on phase diversity receivers (FIG. 12-14) or on double-stage phase diversity receivers (FIGS. 18-19), advantageously a single source followed by a polarization splitter acts as local oscillator for both the end apparatuses 120. In this case, a single OFLL circuit keeps constant the offset between the frequency of one of the two DPSK signals (the latter being mutually locked) and the frequency of the local oscillator.

Although the present invention has been disclosed and described by way of some embodiments, it is apparent to those skilled in the art that several modifications to the described embodiments, as well as other embodiments of the present invention are possible without departing from the essential features thereof/the scope thereof as defined in the appended claims.

The invention claimed is:

1. An optical communication system comprising:
   at least a transmitter apt to emit a differential phase shift keying (DPSK) optical signal having a bit-rate equal to R, the transmitter comprising a laser source, an optical modulator for phase modulating an output of the laser source so as to generate the DPSK optical signal phase-modulated among two phase levels differing by 180° and a differential precoder electrically connected to the optical modulator for driving the optical modulator;
   at least a receiving system for receiving the differential phase shift keying optical signal;
   wherein the receiving system comprises a coherent optical receiving device to coherently receive the propagated DPSK optical signal and to emit at least one electrical signal related to the received DPSK optical signal, and wherein the receiving system further comprises:
   a local oscillator apt to emit an optical field having a phase;
   an optical hybrid apt to mix the optical field and the received DPSK optical signal, the optical hybrid has at least a pair of output ports for respectively outputting either two in phase components or quadrature components of the received DPSK optical signal with respect to the phase of the optical field of the local oscillator;
   at least one photodetector connected to at least one output port of the above pair of output ports for detecting at least one of the either two in-phase components or two quadrature components and for generating a first electrical signal (I) directly proportional to the at least one of the either in-phase or quadrature components; and
   an optical phase locked loop (OPLL) configured for locking the phase of the optical field of the local oscillator to a phase of the received DPSK optical signal and wherein the at least one electrical signal consists of the first electrical signal (I), the OPLL comprises a multiplier connected to an output of each of the at least one and a further photodetector for multiplying the above first and second electrical signal in order to obtain a control signal for controlling a frequency of the optical field of the local oscillator;
   at least one electrical filter for filtering the at least one electrical signal and having −3 dB double-side bandwidth greater than or equal to 0.44 R and lower than or equal to 0.68 R, and at least one squarer for squaring the at least one filtered electrical signal; and,
   an optical link optically connecting the transmitter and the receiving system for transmitting the DPSK optical signal from the transmitter to the receiving system.

2. The system of claim 1, wherein the coherent optical receiving device is a homodyne coherent receiving device.

3. The system of claim 1, wherein the coherent optical receiving device is a heterodyne coherent receiving device.

4. The system of claim 1, wherein the coherent optical receiving device is a phase diversity coherent receiving device.

5. The system of claim 1, wherein the coherent optical receiving device is a phase diversity double-stage coherent receiving device.

6. The system of claim 1, wherein the electrical filter is a low-pass filter.

7. The system of claim 1, wherein the coherent optical receiving device comprises a local oscillator apt to emit an optical field having a phase, and an optical hybrid apt to mix the optical field and the received DPSK optical signal.

8. The system of claim 7, wherein the optical hybrid has at least a pair of output ports for respectively outputting either two in phase components or quadrature components of the received DPSK optical signal with respect to the phase of the optical field of the local oscillator.

9. The system of claim 8, wherein the coherent optical receiving device comprises at least one photodetector connected to at least one output port of the above pair of output ports for detecting at least one of the two in-phase components or the two quadrature components and for generating a first electrical signal (I) directly proportional to the at least one of the in-phase or the quadrature components.

10. The system of the claim 9, wherein the at least one photodetector is a differential photodetector connected to both ports of the at least a pair of output ports for detecting the two in-phase components or the two quadrature components.

11. The system of claim 8, wherein the optical hybrid has a further pair of output ports and wherein the optical hybrid is configured for outputting in-phase and quadrature components of the received DPSK optical signal with respect to the phase of the optical field of the local oscillator respectively at the at least a pair of output ports and the further pair of output ports.

12. The system of claim 8, wherein the coherent optical receiving device comprises a further photodetector connected to at least one output port of the further pair of output ports for detecting at least one quadrature component and for generating a second electrical signal (Q) directly proportional to the at least one quadrature component.

13. The system of claim 12, further configured for keeping a difference in absolute value between a central frequency of the received DPSK optical signal and a central frequency of the optical field of the local oscillator at a value below or equal to 0.02 R.

14. The system of claim 9, wherein the coherent optical receiving device further comprises an optical phase locked loop (OPLL) configured for locking the phase of the optical field of the local oscillator to a phase of the received DPSK optical signal, and wherein the at least one electrical signal consists of the first electrical signal (I).

15. The system of claim 1, wherein the coherent optical receiving device further comprises an optical frequency-locked loop (OFLL) for keeping a difference between a central frequency of the received DPSK optical signal and a central frequency of the optical field of the local oscillator substantially constant at a predetermined value.

16. The system of claim 1, wherein the optical receiving system further comprises a discriminating system for discriminating the at least one squared electrical signal.

17. The system of claim 1, wherein the optical receiving system further comprises an electrical dispersion compensator placed upstream the squarer with respect to the direction of propagation of the at least one electrical signal, for compensating the dispersion of the at least one electrical signal.

18. The system of claim 17, wherein the electrical dispersion compensator comprises at least one tapped delay equalizer or N-tap transversal filter.

19. The system of claim 17, wherein the electrical dispersion compensator is a digital dispersion compensator.

20. The system of claim 17, wherein the electrical dispersion compensator is a synchronous dispersion compensator.

21. An optical communication system comprising:
at least a transmitter apt to emit a differential phase shift keying (DPSK) optical signal having a bit-rate equal to R;
at least a receiving system receiving the differential phase shift keying optical signal the receiving system comprising:
a coherent optical receiving device apt to coherently receive the propagated DPSK optical signal and emitting at least one electrical signal related to the received DPSK optical signal, the coherent optical receiving device comprises a local oscillator emitting an optical field having a phase, and an optical hybrid apt to mix the optical field and the received DPSK optical signal;
at least one electrical filter for filtering the at least one electrical signal and having −3 dB double-side bandwidth greater than or equal to 0.44 R and lower than or equal to 0.68 R; and
at least one squarer for squaring the at least one filtered electrical signal; and
an optical link optically connecting the transmitter and the receiving system for transmitting the DPSK optical signal from the transmitter to the receiving system;
wherein the system keeps a difference in absolute value between a central frequency of the received DPSK optical signal and a central frequency of the optical field of the local oscillator at a predetermined value comprised between R and 3 R.

22. The system of claim 21, further comprising a synchronous demodulator for receiving the at least one electrical signal.

23. The system of claim 21, further comprising a carrier recovery circuit for recovering a carrier from the at least one electrical signal and a multiplier for multiplying the at least one electrical signal by the carrier.

24. The system of claim 21, wherein the at least one electrical signal is the first electrical signal and wherein the receiving system further comprises a further electrical filter for filtering the second electrical signal (Q) and having −3 dB double-side bandwidth greater than or equal to 0.44 R and lower than or equal to 0.68 R, a further squarer for squaring the second filtered electrical signal, and an adder for adding the first and second squared electrical signal, and the at least one electrical filter and the further electrical filter are pass-band filters centered around the predetermined value.

25. An optical communication system comprising:
at least a transmitter apt to emit a differential phase shift keying (DPSK) optical signal having a bit-rate equal to R;
at least a receiving system receiving the differential phase shift keying optical signal, wherein the receiving system comprises:
a coherent optical receiving device to coherently receive the propagated DPSK optical signal and to emit at least one electrical signal related to the received DPSK optical signal, the coherent optical receiving device comprising:
a local oscillator apt to emit an optical field having a phase, and
an optical hybrid apt to mix the optical field and the received DPSK optical signal, the optical hybrid has at least a pair of output ports for respectively outputting either two in phase components or quadrature components of the received DPSK optical signal with respect to the phase of the optical field of the local oscillator, and a further pair of output ports and wherein the optical hybrid is configured for outputting in-phase and quadrature components of the received DPSK optical signal with respect to the phase of the optical field of the local oscillator respectively at the at least a pair of output ports and the further pair of output ports;
a further photodetector connected to at least one output port of the further pair of output ports for detecting at least one quadrature component and for generating a second electrical signal (Q) directly proportional to the at least one quadrature component; and
a pair of multipliers connected for receiving the first (I) and second (Q) electrical signal and for multiplying them respectively by an electrical local oscillator signal and by the electrical local oscillator signal phase shifted by 90°, and an adder connected for receiving the multiplied first and second electrical signal and for outputting a sum of the multiplied first and second electrical signal, the sum being the at least one electrical signal;
at least one electrical filter for filtering the at least one electrical signal and having −3 dB double-side bandwidth greater than or equal to 0.44 R and lower than or equal to 0.68 R; and
at least one squarer for squaring the at least one filtered electrical signal; and
an optical link optically connecting the transmitter and the receiving system for transmitting the DPSK optical signal from the transmitter to the receiving system;
wherein the system is further configured for keeping a difference in absolute value between a central frequency of the received DPSK optical signal and a central frequency of the optical field of the local oscillator at a value below or equal to 0.02 R.

26. The system of claim 25, wherein the at least one electrical signal is the first electrical signal and wherein the receiving system further comprises a further electrical filter for filtering the second electrical signal (Q) and having −3 dB double-side bandwidth greater than or equal to 0.44 R and lower than or equal to 0.68 R, a further squarer for squaring the second filtered electrical signal, and an adder for adding the first and second squared electrical signal.

27. The system of claim 25, wherein the at least one electrical filter and the further electrical filter are low-pass filters.

28. An optical communication system comprising:
at least a transmitter apt to emit a differential phase shift keying (DPSK) optical signal having a bit-rate equal to R;
a receiving system for receiving the differential phase shift keying optical signal, the receiving system comprising:
a coherent optical receiving device apt to coherently receive the propagated DPSK optical signal and emitting at least one electrical signal related to the received DPSK optical signal, and wherein the receiving system further comprises at least one electrical filter for filtering the at least one electrical signal and having −3 dB double-side bandwidth greater than or equal to 0.44 R and lower than or equal to 0.68 R;
at least one squarer for squaring the at least one filtered electrical signal; and
an electrical dispersion compensator placed upstream the squarer with respect to the direction of propagation of the at least one electrical signal, for compensating the dispersion of the at least one electrical signal; and
an optical link optically connecting the transmitter and the receiving system for transmitting the DPSK optical signal from the transmitter to the receiving system;
wherein the electrical dispersion compensator comprises delay-lines having delays equal to an integer multiple of a given amount comprised between 0.7/R and 1.4/R.

29. An optical communication system comprising:
at least a transmitter apt to emit a differential phase shift keying (DPSK) optical signal having a bit-rate equal to R;
at least a receiving system for receiving the differential phase shift keying optical signal;
an optical link optically connecting the transmitter and the receiving system for transmitting the DPSK optical signal from the transmitter to the receiving system, wherein the receiving system comprises a coherent optical receiving device to coherently receive the propagated DPSK optical signal and to emit at least one electrical signal related to the received DPSK optical signal, and wherein the receiving system further comprises at least one electrical filter for filtering the at least one electrical signal and having −3 dB double-side bandwidth greater than or equal to 0.44 R and lower than or equal to 0.68 R, and at least one squarer for squaring the at least one filtered electrical signal; and
a polarization matching system for matching the polarization of the received DPSK optical signal with the polarization of the optical field of the local oscillator.

30. The system of claim 29, wherein the polarization matching system comprises a polarization stabilizer upstream to the optical hybrid with respect to the direction of propagation of the DPSK optical signal for receiving in input the propagated DPSK optical signal having a stochastically time-varying polarization and to emit in output a stabilized DPSK optical signal having fixed polarization matched to the one of the optical field of the local oscillator at the optical hybrid.

31. The system of claim 29, wherein the polarization matching system comprises a polarization transformer upstream to the optical hybrid with respect to the direction of propagation of the optical field of the local oscillator, for receiving in input the optical field and emitting in output a transformed optical field having polarization matched to the one of the received DPSK optical signal at the optical hybrid and a feedback system configured for controlling the polarization transformer on the basis of at least one among the first and the second electrical signal.

32. The system of claim 29, wherein the polarization matching system comprises a polarization splitter for splitting the received DPSK optical signal into two polarized components.

33. An optical communication system comprising:
at least a transmitter apt to emit a differential phase shift keying (DPSK) optical signal having a bit-rate equal to R;
at least a receiving system for receiving the differential phase shift keying optical signal, the receiving system comprising:
a coherent optical receiving device to coherently receive the propagated DPSK optical signal and to emit at least one electrical signal related to the received DPSK optical signal;
at least one electrical filter for filtering the at least one electrical signal and having −3 dB double-side bandwidth greater than or equal to 0.44 R and lower than or equal to 0.68 R; and
at least one squarer for squaring the at least one filtered electrical signal; and
an optical link optically connecting the transmitter and the receiving system for transmitting the DPSK optical signal from the transmitter to the receiving system;
a further transmitter;
a polarization multiplexer optically connected to the transmitter and the further transmitter and having an output port optically connected to the optical link,
a polarization demultiplexer placed at the end of the optical link and having a first output port optically connected to the receiving system;
a polarization matching system for matching the polarization of the received DPSK optical signal with the polarization of the optical field of the local oscillator; and
a second output port optically connected to a further receiving system configured according to the receiving system.

34. The system of claim 33, further comprising a polarization stabilizer optically connected to the polarization demultiplexer in an upstream position with respect to the direction of propagation of the DPSK optical signal so as to stabilize the polarization state of the propagated DPSK optical signal before entering the polarization demultiplexer.

35. A method of optical transmission comprising the steps of:
generating, using a transmitter, a differential phase shift keying (DPSK) optical signal having a bit-rate R, the transmitter comprising a laser source, an optical modulator for phase modulating an output of the laser source so as to generate the DPSK optical signal phase-modulated among two phase levels differing by 180° and a differential precoder electrically connected to the optical modulator for driving said optical modulator;
propagating the DPSK optical signal along a transmission line;
coherently receiving the propagated DPSK optical signal in order to obtain at least one electrical signal related to the propagated DPSK optical signal;
filtering the at least one electrical signal by way of an electrical filter having −3 dB double-side bandwidth greater than or equal to 0.44 R and lower than or equal to 0.68 R; and
squaring the at least one filtered electrical signal, and;
keeping a difference in absolute value between a central frequency of the received DPSK optical signal and a central frequency of the optical field of a local oscillator at a value below or equal to 0.02 R.

36. The method of claim 35, wherein coherently receiving the propagated DPSK optical signal comprises:
   mixing the propagated DPSK optical signal with an optical oscillation; and
   detecting the mixed signal in order to obtain the at least one electrical signal.

37. The method of claim 35, further comprising locking a phase of the optical oscillation with a phase of the propagated DPSK optical signal.

38. The method of claim 35, further comprising discriminating the squared electrical signal.

39. The method of claim 35, further comprising:
   emitting an optical field having a phase;
   mixing the optical field and the received DPSK optical signal; and
   outputting two in phase components or quadrature components of the received DPSK optical signal with respect to the phase of the optical field of the local oscillator.

* * * * *